United States Patent
Kisanuki et al.

(10) Patent No.: US 7,954,587 B2
(45) Date of Patent: Jun. 7, 2011

(54) COLLISION BEHAVIOR CONTROL APPARATUS

(75) Inventors: Yoshikatsu Kisanuki, Seto (JP); Tetsuzou Inoue, Nagoya (JP); Kazunori Furukawa, Ichinomiya (JP); Kazuo Miki, Nisshin (JP); Eiichi Ono, Toyota (JP); Yoshiki Ninomiya, Nagoya (JP); Kiyokazu Sunami, Tajimi (JP)

(73) Assignee: Kabushiki Kaisha Toyota Chuo Kenkyusyo, Aichi-gun (JP)

( * ) Notice: Subject to any disclaimer, the term of this patent is extended or adjusted under 35 U.S.C. 154(b) by 321 days.

(21) Appl. No.: 11/332,178

(22) Filed: Jan. 17, 2006

(65) Prior Publication Data

US 2006/0186702 A1     Aug. 24, 2006

(30) Foreign Application Priority Data

Jan. 17, 2005   (JP) .................................. 2005-009680
Dec. 28, 2005   (JP) .................................. 2005-380231

(51) Int. Cl.
*B60R 21/34* (2006.01)
(52) U.S. Cl. ................. 180/274; 280/730.1; 296/187.04
(58) Field of Classification Search .................. 180/274; 280/730.1; 296/187.04
See application file for complete search history.

(56) References Cited

U.S. PATENT DOCUMENTS

| | | | |
|---|---|---|---|
| 6,271,747 B1 | 8/2001 | Fendt et al. | |
| 7,000,725 B2* | 2/2006 | Sato et al. | 180/274 |
| 7,036,844 B2* | 5/2006 | Hammer et al. | 280/730.1 |
| 7,073,619 B2* | 7/2006 | Alexander et al. | 180/274 |
| 7,143,856 B2* | 12/2006 | Takahashi et al. | 180/274 |
| 7,258,191 B1* | 8/2007 | Rammer | 180/274 |
| 7,325,642 B2* | 2/2008 | Roux et al. | 180/274 |
| 7,416,043 B2* | 8/2008 | Pipkorn et al. | 180/274 |
| 2004/0020888 A1 | 2/2004 | Payne et al. | |
| 2004/0262893 A1* | 12/2004 | Kempf et al. | 280/730.1 |
| 2005/0161273 A1* | 7/2005 | Makita et al. | 180/274 |
| 2005/0269805 A1* | 12/2005 | Kalliske et al. | 280/730.1 |
| 2006/0169517 A1* | 8/2006 | Mishra | 180/274 |
| 2006/0213714 A1* | 9/2006 | Igawa | 180/274 |

FOREIGN PATENT DOCUMENTS

| | | |
|---|---|---|
| DE | 41 14 016 | 11/1992 |
| DE | 199 35 342 | 2/2001 |
| DE | 100 20 658 | 10/2001 |
| DE | 100 20 660 | 10/2001 |
| DE | 101 41 730 | 3/2003 |
| DE | 103 23 483 | 12/2004 |
| EP | 0 950 583 | 10/1999 |
| EP | 1 319 560 | 6/2003 |
| JP | 5-182097 | 7/1993 |
| JP | 6-72284 | 3/1994 |
| JP | 6-239198 | 8/1994 |

(Continued)

*Primary Examiner* — Paul N Dickson
*Assistant Examiner* — Nicole Verley
(74) *Attorney, Agent, or Firm* — Oblon, Spivak, McClelland, Maier & Neustadt, L.L.P.

(57) ABSTRACT

A collision behavior control apparatus which comprises a contacting portion disposed in a portion of the front of a vehicle, and which, at the time of collision against a pedestrian or a two-wheeler with a rider riding thereon, controls the behavior of the pedestrian or the two-wheeler rider by pushing the pedestrian or the two-wheeler rider separated from the two-wheeler with the contacting portion, wherein the pedestrian or the two-wheeler rider is pushed by the contacting portion such that the pedestrian or the two-wheeler rider is not bumped up onto the hood, whereby the pedestrian or the two-wheeler rider is moved to the vehicle side.

9 Claims, 21 Drawing Sheets

FOREIGN PATENT DOCUMENTS

| | | |
|---|---|---|
| JP | 7-108903 | 4/1995 |
| JP | 7-156749 | 6/1995 |
| JP | 8-258667 | 10/1996 |
| JP | 9-164906 | 6/1997 |
| JP | 2000-264146 | 9/2000 |
| JP | 2001-1852 | 1/2001 |
| JP | 2001-334895 | 12/2001 |
| JP | 2002-513351 | 5/2002 |
| JP | 2002-542110 | 12/2002 |
| JP | 2003-2135 | 1/2003 |
| JP | 2003-127810 | 5/2003 |
| JP | 2003-226211 | 8/2003 |
| JP | 2003-291758 | 10/2003 |
| JP | 2003-346297 | 12/2003 |
| JP | 2005-41391 | 2/2005 |
| JP | 2006035892 A * | 2/2006 |
| JP | 2006036120 A * | 2/2006 |
| WO | WO 2004016478 A1 * | 2/2004 |

* cited by examiner

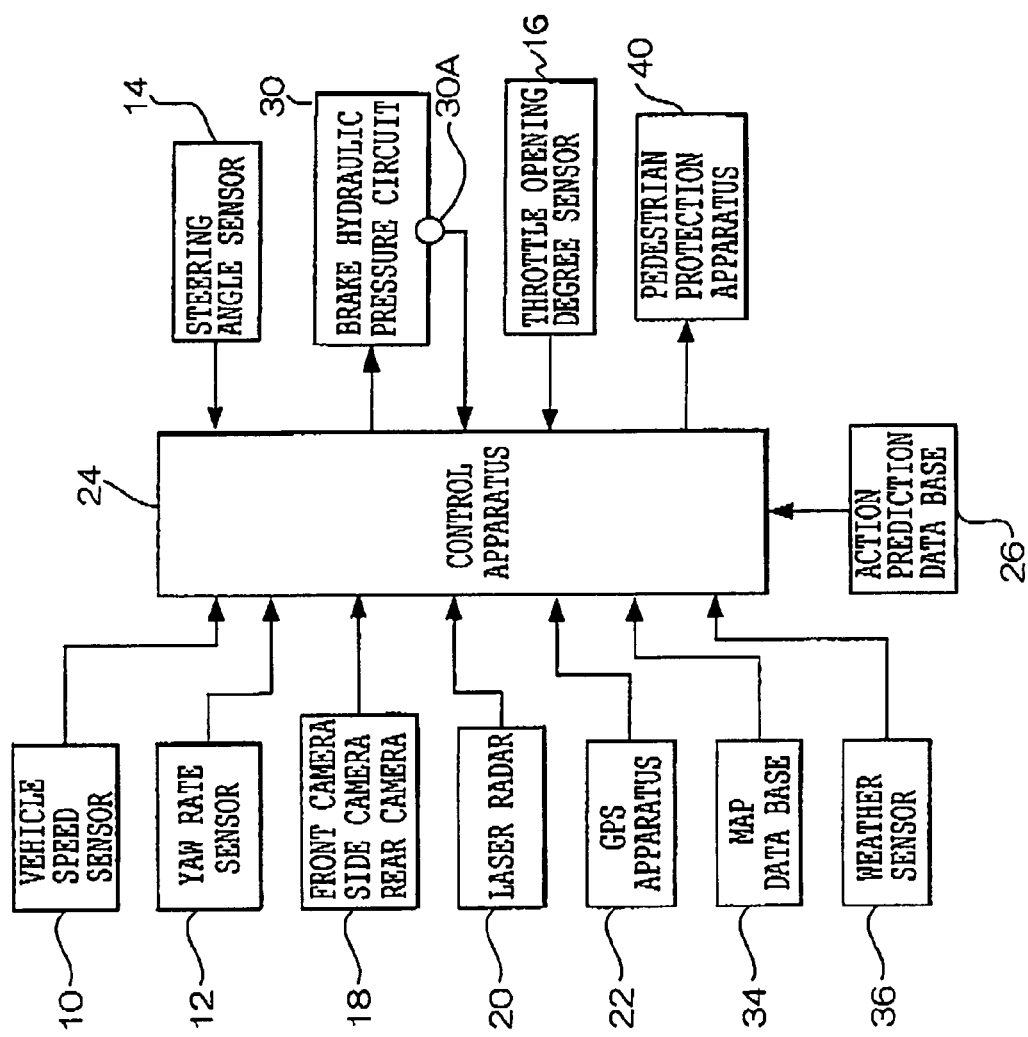

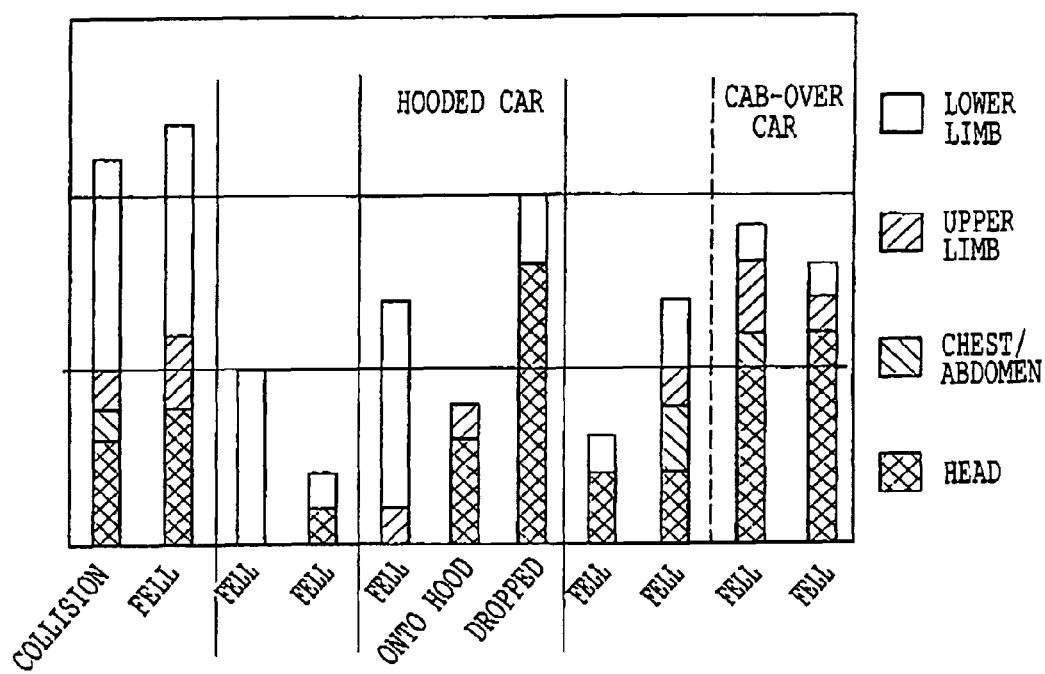
F I G. 10

F I G. 1 4
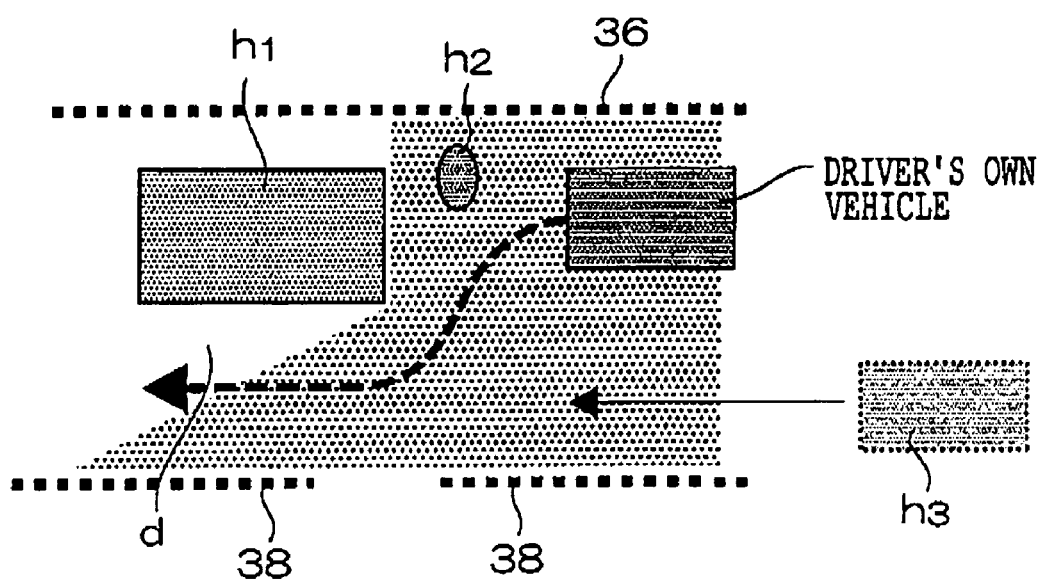

FUTURE RISK MAP

TWO-WHEELER SIDE COLLISION

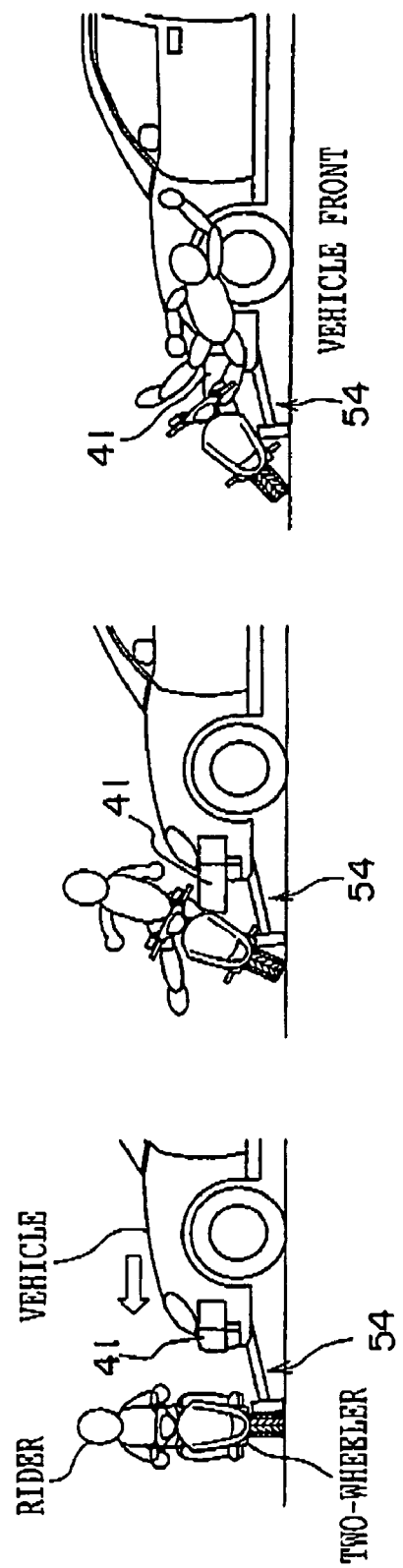

F I G. 24A
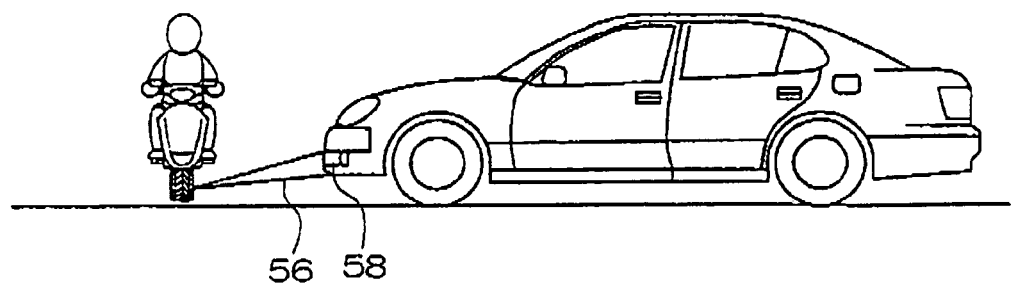
F I G. 24B
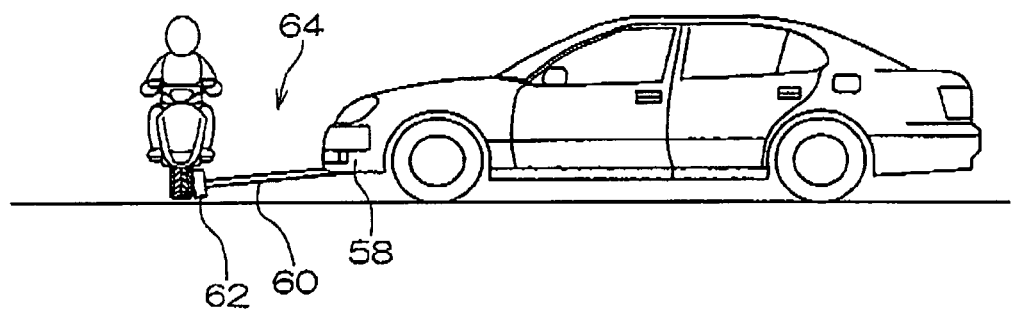
F I G. 24C
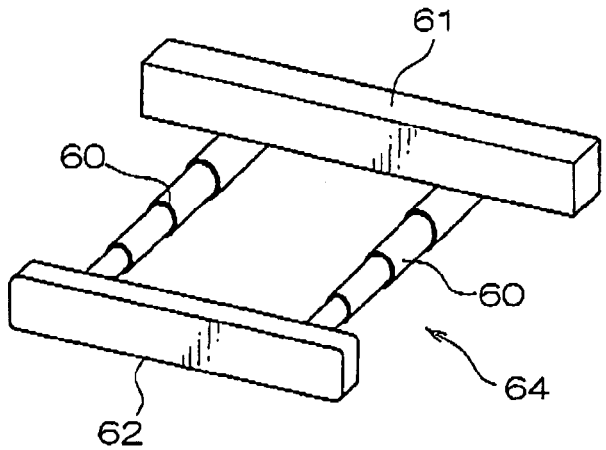

COLLISION BEHAVIOR CONTROL APPARATUS

CROSS-REFERENCE TO RELATED APPLICATION

This application claims priority under 35 USC 119 from Japanese Patent Application Nos. 2005-9680 and 2005-380231, the disclosures of which are incorporated by reference herein.

BACKGROUND OF THE INVENTION

Field of the Invention

The present invention relates to a pedestrian collision behavior control apparatus, and particularly to a pedestrian collision behavior control apparatus which, when a vehicle during running collides against a pedestrian, controls the collision behavior of the pedestrian so as to prevent the pedestrian from being injured at the head and face site in dropping onto the road surface after having collided against the vehicle, or, which, when a vehicle during running collides against a two-wheeler with a rider riding thereon, controls the collision behavior of the two-wheeler rider so as to protect the two-wheeler rider.

It is known that, when a vehicle during running collides against a pedestrian, the pedestrian is swept at the lower half of the body thereof by the bumper at the front of the vehicle body, or the like, being bumped up onto the hood or the roof of the vehicle to be subjected to a second collision. As the apparatus for alleviating the impact on the pedestrian due to such a secondary collision, air bag apparatuses which alleviate the impact due to the collision against the front pillar, which has a high rigidity, are known (Japanese Patent Application Laid-Open (JP-A) Nos. 7-108903/1995, 2000-264146). The air bag apparatus in JP-A No. 7-108903/1995 is composed of a hood air bag and a pillar air bag, and when the collision detection means detects a collision against a pedestrian, the air bag element is developed to buffer the impact on the pedestrian due to the secondary collision.

On the other hand, with the air bag apparatus in JP-A No. 2000-264146, when the sensing means detects a collision against a pedestrian, a pillar air bag which is expanded to be developed so as to cover the front pillar, which has a high rigidity, and an air bag having a laceration prevention membrane that covers the wind shield outside surface in synchronization with the development of the pillar air bag are expanded to be developed, with a hood movement mechanism which moves the hood rear portion to a prescribed upper position and then holds it being operated, whereby the impact on the pedestrian due to the secondary collision is buffered.

These conventional air bag apparatuses are those which buffer the secondary collision against the pedestrian bumped up onto the vehicle by the collision.

In addition, an air bag apparatus for preventing the pedestrian bumped up onto the vehicle hood from being dropped onto the road surface to be injured has been disclosed (JP-A No. 7-156749/1995). With JP-A No. 7-156749/1995, the air bag is developed such that a wall is formed in the hood peripheral portion. Thereby, the pedestrian bumped up onto the vehicle hood is prevented from being dropped onto the road surface. In addition, a dropping prevention net which, in addition to a hood air bag which is expanded to be developed on the hood when a pedestrian collides, is developed on the hood with a prescribed time lag being given from the expansion development of the hood air bag has been disclosed (JP-A No. 8-258667/1996). According to JP-A No. 8-258667/1996, the pedestrian is held on the hood by the dropping prevention net, being prevented from dropping onto the road surface, and thus occurrence of an injury can be prevented.

In addition, according to the statistics of the traffic accidents, the rate of the deads due to an accident during riding on the bicycle, motorized bicycle, automatic two-wheeler, or the like, (hereinafter referred to as two-wheeler) of the total traffic accident deads attains approx. 30%, the next highest rate after that for the deads due to an accident during riding on a vehicle or walking. Collisions between two-wheeler and vehicle are classified into four broad general categories of form: vehicle collision against two-wheeler side (two-wheeler side collision), two-wheeler collision against vehicle side (vehicle side collision), collision of two-wheeler front against vehicle (two-wheeler front collision), and collision of vehicle against two-wheeler rear (two-wheeler rear collision).

It is confirmed that, with the collision behavior of the two-wheeler rider when a vehicle collides against the side of a two-wheeler, as shown in FIG. 22 illustrating the collision form, which is often caused as a sudden accident, or the like, there occurs a situation in which the two-wheeler rider is bumped up onto the hood (bonnet), colliding against the wind shield, root, A-pillar, or the like.

Therefore, in order to alleviate the damage to the two-wheeler rider in the case of a two-wheeler side collision, it is effective that, as is the case with pedestrian protection, not only the two-wheeler rider being bumped up onto the vehicle is prevented, but also prevention of the damage due to run over is carried out, and particularly it can be considered to be effective that the collision behaviors of the two-wheeler and the two-wheeler rider are controlled for prevention of the two-wheeler rider from being bumped up onto the vehicle.

As the conventional art for protection of the two-wheeler and two-wheeler rider, the arts as disclosed in Japanese Patent Laid-Open Publication No. 5-182097/1993, Japanese Patent Laid-Open Publication No. 6-72284/1994, Japanese Patent Laid-Open Publication No. 2002-513351, Japanese Patent Laid-Open Publication No. 2003-226211, Japanese Patent Laid-Open Publication No. 2003-346297, Japanese Patent Laid-Open Publication No. 2003-291758, Japanese Patent Laid-Open Publication No. 2005-41391 are known.

However, as described above, in the collision between a vehicle and a pedestrian, the pedestrian behavior after the collision varies depending upon the collision speed, the pedestrian stature, the geometry of the vehicle front face section, and the like, and the injury situation of the pedestrian also varies depending upon the behavior. Therefore, in order to implement the pedestrian protection, a measure is required for each particular collision behavior of the pedestrian, and particularly there is the need for providing a protection apparatus which takes into account the reduction of collision against the road, however, with the conventional apparatus, there has been a problem that the effect for reduction of the collision against the road surface is not sufficient.

In addition, in the case of the collision of a two-wheeler, there occurs a situation in which the two-wheeler rider is sandwiched between the two-wheeler and the vehicle, and thus controlling the collision behavior of the rider is not easy. In addition, the two-wheeler rider may also be injured by such sandwiching between the two-wheeler and the vehicle. With the conventional art, the behavior control also taking the collision behavior of the two-wheeler into account is not carried out in controlling the collision behavior of the two-wheeler rider, thus a problem that the effect for collision reduction is not sufficient has been presented.

SUMMARY OF THE INVENTION

The present invention has been made in view of the above circumstances.

The present invention provides a collision behavior control apparatus which comprises a contacting portion disposed in a portion of the front of a vehicle, and which, at the time of collision against a pedestrian or a two-wheeler with a rider riding thereon, controls the behavior of the pedestrian or the two-wheeler rider by pushing the pedestrian or the two-wheeler rider separated from the two-wheeler with the contacting portion, wherein the pedestrian or the two-wheeler rider is pushed by the contacting portion such that the pedestrian or the two-wheeler rider is not bumped up onto the hood of the vehicle, whereby the pedestrian or the two-wheeler rider is moved to the vehicle side.

For collision against a two-wheeler, the present inventor et al. has taken note of an experimental result that the two-wheeler and the two-wheeler rider are separated from each other after the collision, and they exhibit different collision behaviors, respectively, and considered that the connection between the two-wheeler and the rider thereon is not firm, and they can be easily separated from each other. Then, the present inventor et al. has concluded that, in order to solve the above-mentioned problem, it is necessary to control the collision behaviors of the two-wheeler and the rider thereon individually, and provided an invention with which the behavior of the two-wheeler rider separated from the two-wheeler is controlled, as described above.

The collision behavior control apparatus of the present invention may be adapted to comprise a contacting member comprising the contacting portion, and pushing-out means for pushing out the contacting member, wherein, when the contacting member is pushed out, the pedestrian or the two-wheeler rider is pushed by the contacting portion of the contacting member, whereby the pedestrian or the two-wheeler rider is moved to the vehicle side.

The collision behavior control apparatus of the present invention may be adapted to comprise an air bag element which comprises the contacting portion, and is accommodated in a portion of the front of a vehicle, being folded; and an inflator which develops the air bag element, wherein, when the air bag element is developed, the pedestrian or the two-wheeler rider is pushed in the lateral direction by the contacting portion of the developed air bag element such that the pedestrian or the two-wheeler rider is not bumped up onto the hood of the vehicle, whereby the pedestrian or the two-wheeler rider is moved to the vehicle side; or may be adapted to comprise an air bag element which is accommodated in a portion of the front of a vehicle, being folded; an inflator which develops the air bag element; and a contacting member which comprises the contacting portion, and is mounted to the air bag element, wherein, when the air bag element is developed, the pedestrian or the two-wheeler rider is pushed in the lateral direction by the contacting portion of the contacting member mounted to the developed air bag element such that the pedestrian or the two-wheeler rider is not bumped up onto the hood of the vehicle, whereby the pedestrian or the two-wheeler rider is moved to the vehicle side.

The collision behavior control apparatus of the present invention may be adapted to provide a two-wheeler behavior control element comprising an air bag element which comprises a contacting portion to be contacted with a two-wheeler, and is accommodated in a portion of the front of a vehicle, being folded; and an inflator which develops the air bag element, that, when the air bag element is developed, pushes the two-wheeler by the two-wheeler contacting portion of the developed air bag element, thereby controlling the behavior of the two-wheeler, and separating the two-wheeler and the two-wheeler rider from each other; may be adapted to provide a two-wheeler behavior control element comprising an air bag element which is accommodated in a portion of the front of a vehicle, being folded; an inflator which develops the air bag element; and a two-wheeler contacting member which comprises a contacting portion to be contacted with a two-wheeler, and is mounted to the air bag element, that, when the air bag element is developed, pushes the two-wheeler by the two-wheeler contacting portion of the two-wheeler contacting member mounted to the developed air bag element, thereby controlling the behavior of the two-wheeler, and separating the two-wheeler and the two-wheeler rider from each other; or may be configured to provide a two-wheeler behavior control element comprising extension and contraction means which is extendably and contractably provided for a vehicle; a two-wheeler contacting member which comprises a contacting portion to be contacted with a two-wheeler, and is mounted to the tip of the extension and contraction means; and driving means which drives the extension and contraction means such that the extension and contraction means is extended, that, when the extension and contraction means is extended, pushes the two-wheeler by the two-wheeler contacting portion of the two-wheeler contacting member, thereby controlling the behavior of the two-wheeler, and separating the two-wheeler and the two-wheeler rider from each other.

In addition, the collision behavior control apparatus of the present invention may be configured to include relative position detection means for detecting the relative position of a pedestrian or a two-wheeler with a rider riding thereon with respect to a vehicle; direction speed detection means for detecting the direction of movement and the speed of the vehicle; contacting means which contacting portion is disposed in a portion of the front of a vehicle; collision determination means for determining whether there occurs a collision against the pedestrian or the two-wheeler, on the basis of a piece of relative position information indicating the relative position detected by the relative position detection means and a piece of information indicating the direction of movement and the speed of the vehicle detected by the direction speed detection means; collision process prediction means for predicting the process until there occurs a collision against the pedestrian or the two-wheeler, on the basis of the result of determination of the collision determination means, the piece of relative position information, and the piece of information indicating the direction of movement and the speed of the vehicle, and control means for controlling, on the basis of a piece of prediction information predicted by the collision process prediction means, the contacting means such that the pedestrian or the two-wheeler rider separated from the two-wheeler is pushed such that the pedestrian or the two-wheeler rider is not bumped up onto the hood of the vehicle, thereby moving the pedestrian or the two-wheeler rider to the vehicle side.

The above-mentioned contacting means may be configured to include an air bag element which comprises the contacting portion, and is accommodated in a portion of the front of a vehicle, being folded, and an inflator which develops the air bag element; may be configured to include an air bag element which is accommodated in a portion of the front of a vehicle, being folded; an inflator which develops the air bag element; and a contacting member which comprises the contacting portion, and is mounted to the air bag element; or may be configured to include extension and contraction means which is extendably and contractably provided for a vehicle; a contacting member which comprises the contacting means, and is mounted to the tip of the extension and contraction means; and driving means which drives the extension and contraction means such that the extension and contraction means is extended.

When a pedestrian is to be pushed, it is preferable to push a region within a prescribed range including the center of gravity of the pedestrian. In addition, the collision behavior control apparatus of the present invention may be adapted to provide a two-wheeler behavior control element which pushes the two-wheeler to control the behavior of the two-wheeler, and separate the two-wheeler and the two-wheeler rider, and control the two-wheeler behavior control element by the control means on the basis of a piece of prediction information predicted by the collision process prediction means such that the two-wheeler and the two-wheeler rider are separated from each other. In this case, it is effective to press a portion in the vicinity of the road surface of the wheel of the two-wheeler by the two-wheeler behavior control element.

The two-wheeler behavior control element may be configured to include an air bag element which comprises a contacting portion to be contacted with a two-wheeler, and is accommodated in a portion of the front of a vehicle, being folded, and an inflator which develops the air bag element; may be configured to include an air bag element which is accommodated in a portion of the front of a vehicle, being folded; an inflator which develops the air bag element; and a two-wheeler contacting member which comprises a contacting portion to be contacted with a two-wheeler, and is mounted to the air bag element; or may be configured to include extension and contraction means which is extendably and contractably provided for a vehicle; a two-wheeler contacting member which comprises a contacting portion to be contacted with a two-wheeler, and is mounted to the tip of the extension and contraction means; and driving means which drives the extension and contraction means such that the extension and contraction means is extended.

In the present invention, the behavior of the two-wheeler may be controlled by pushing the two-wheeler by means of the contacting portion which controls the behavior of the pedestrian or the two-wheeler rider, or the behavior of the pedestrian or the two-wheeler rider may be controlled by using the two-wheeler behavior control element.

As described above, according to the present invention, by controlling the behavior of the pedestrian or the two-wheeler rider at the time of collision, the pedestrian or the two-wheeler rider from being bumped up onto the hood can be suppressed to prevent the pedestrian or the two-wheeler rider from dropping from a high to the road surface.

As described above, according to the present invention, the pedestrian or the two-wheeler rider is pushed in the lateral direction such that the pedestrian is not bumped up onto the hood of the vehicle, whereby the pedestrian or the two-wheeler rider is moved to the vehicle side, thus an effect that the pedestrian or the two-wheeler rider from being bumped up onto the hood can be suppressed to prevent the pedestrian from dropping from a high to the road surface can be obtained. In addition, because the collision against the vehicle is avoided, the effect of prevention therefrom can be obtained regardless of the geometry of the vehicle front section. The protection effect is great also with the vehicle having no hood.

BRIEF DESCRIPTION OF THE DRAWINGS

FIG. 1 is a block diagram illustrating the vehicle motion control apparatus of a first embodiment;

FIG. 10 is a figure showing the result of investigation of the injury situation for each of the types of pedestrian behavior at the time of collision as indicated in FIG. 9;

FIG. 14 shows an example of the environment map;

FIG. 23 is a schematic drawing illustrating the result of a simulation in the two-wheeler side collision;

FIG. 24A, FIG. 24B, and FIG. 24C are schematic drawing illustrating examples of the two-wheeler collision behavior control element;

DETAILED DESCRIPTION OF THE INVENTION

Figure 2:
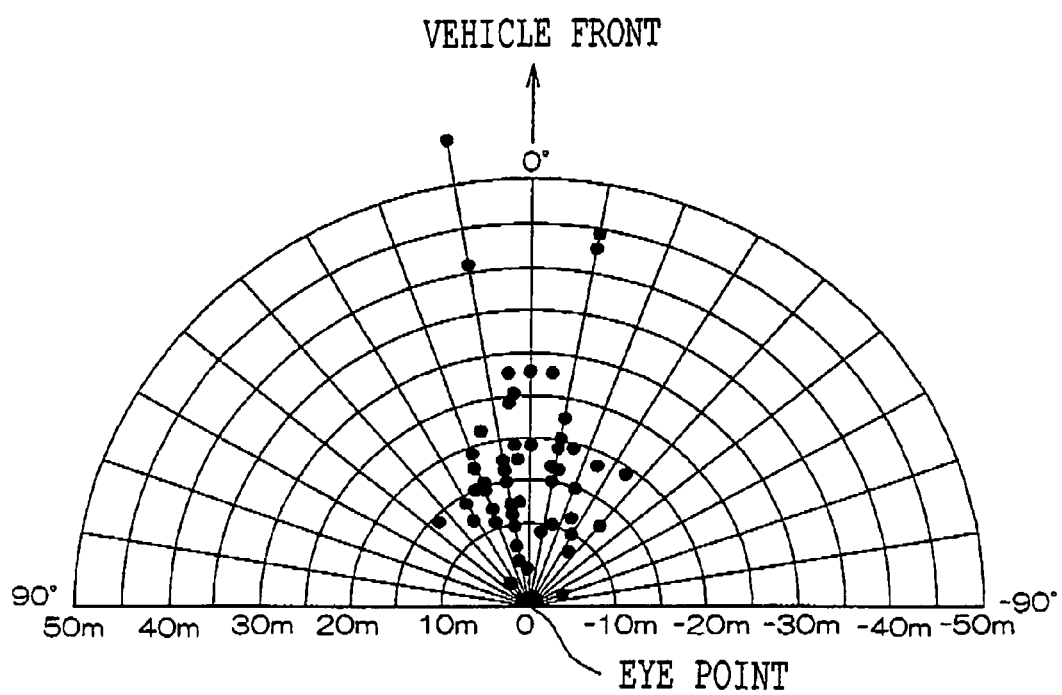
FIG. 2 is a figure illustrating the result of analysis of the pedestrian accidents at the vehicle front in the past using the eye point of the driver.
Figure 3:
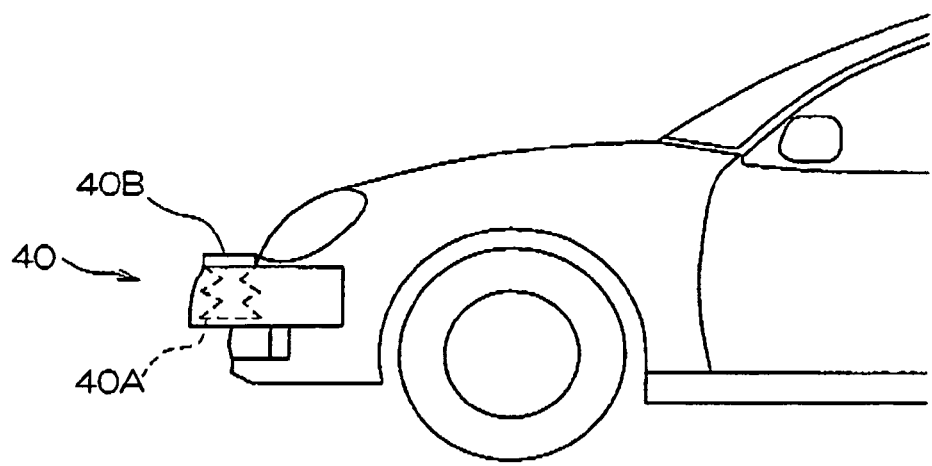
FIG. 3 is a side view illustrating the state of the pedestrian protection apparatus being accommodated in the bumper.

Hereinbelow, embodiments of the present invention will be described in detail with reference to the drawings.

The first embodiment is an embodiment with which the behavior control apparatus of the present invention has been applied to a pedestrian vehicle control apparatus. As shown in FIG. 1, the pedestrian collision behavior control apparatus is provided with sensors loaded on a vehicle as running state detection means for detecting the running state of the driver's own vehicle; sensors loaded on the vehicle as external environment detection means for detecting the external environment state; and a control apparatus which controls a pedestrian protection apparatus loaded on the driver's own vehicle on the basis of the detection data from these sensors.

As the sensors which detect the running state of the driver's own vehicle, a vehicle speed sensor 10 which detects the vehicle speed, a yaw rate sensor 12 which detects the yaw rate; a steering angle sensor 14 which detects the steering angle; and a throttle opening degree sensor 16 which detects the opening degree of a throttle valve are provided.

In addition, as the sensors which detect the external environment state, a camera 18 which shoots the front, side, and rear of the driver's own vehicle; a laser radar 20 which detects an obstacle in front of the driver's own vehicle; a GPS apparatus 22 which detects the position of the driver's own vehicle; and a weather sensor 36 which is configured to comprise a barometer sensor, a temperature sensor, a humidity sensor, and the like, are provided. Instead of the laser radar, or together with the laser radar, a millimeter wave radar may be provided. Besides the above-mentioned laser radar which detects the vehicle front, laser radars which detect the vehicle side and the vehicle rear may be provided.

The camera 18 is composed of a front camera which is mounted in the upper portion, or the like, of the front window of the vehicle such that it shoots the front of the vehicle; a rear camera made up of a pair of cameras which are mounted in the vicinity of the right and left edges of the rear window, or the like, such that they shoot the rear of the vehicle; and a side camera which is mounted at the door mirror such that it shoots the side of the vehicle. The front camera, side camera, and rear camera are composed of a small-sized CCD camera or CMOS camera, shoot the region including the road situation of the front, side, rear of the driver's own vehicle, and output the image data obtained by shooting. The image data outputted is inputted to a control apparatus 24 which is composed of a microcomputer, and the like. As the camera, it is preferable to use a front infrared camera, or a front infrared camera and rear infrared camera, or a front infrared camera, side infrared camera, and rear infrared camera, besides the front camera, side camera and rear camera. By using the infrared camera, the pedestrians can be reliably detected. Instead of the above-mentioned infrared camera, a near-infrared camera may be used, and also in this case, the pedestrians can be reliably detected as well.

The laser radar 20 is configured to comprise a light emitting device made up of a semiconductor laser which irradiates an infrared pulse for scanning in the horizontal direction, and a light receiving element which receives the infrared pulse reflected from the obstacle (pedestrian, front vehicle, or the like) in front, being mounted on the front grille or bumper of the vehicle. With this laser radar 20, the distance from the driver's own vehicle to the obstacle in front and the direction of presence of the obstacle can be detected on the basis of the time period of reaching of the reflected infrared pulse from the point of time at which it is issued from the light emitting device until it is received by the light receiving element. The data indicating the distance to the obstacle and the direction of presence of the obstacle which have been detected by the laser radar 20 is inputted to the control apparatus 24.

FIG. 2 shows the result of analysis of the pedestrian accidents at the vehicle front in the past using the point of view of the driver. As can be seen from FIG. 2, the pedestrian accidents are concentrated in the range of front 40 m in the range of 60 deg for each of the right- and left-hand angles of visibility, thus the photographing range for the front camera and the detection range for the laser radar to detect the obstacle in front is preferably within the range of front 40 m in the range of 60 deg for each of the right- and left-hand angles of visibility.

From the GPS apparatus 22, the positional data indicating the position of the driver's own vehicle is outputted to be inputted to the control apparatus 24. With the control apparatus 24, the map information including the data of the road geometry, and the like, stored in the map data base 34 is read in, and the position of the driver's own vehicle is shown on the map represented by the map information read in. Because the map information includes the data of the road geometry, the position on the road, and the like, of the obstacle detected can be determined.

In addition, to the control apparatus 24, an action prediction data base 26 is connected which stores data indicating the probability of presence of an obstacle, and data, such as the action prediction model for predicting the action of the obstacle, and the like, such as the pedestrian action prediction model for predicting the action of the pedestrian, and the like.

This pedestrian action prediction model will be described. As a result of the analysis by the present inventor et al. about the actions which were taken by the pedestrians at the time of the accident, the walking actions of the pedestrians at the time of the accident could be classified into: (i) assuming that the driver will stop the car, the pedestrian continued walking or running as it is; (ii) the pedestrian became aware of the car getting near, and stopped the action (walking, running, or the like); (iii) the pedestrian became aware of the car getting near, and tried to stop the action, but could not stop it; and (iv) the pedestrian became aware of the car getting near, but could not taken any action, and the like. In addition, it was confirmed that the rate of action of the pedestrian at the time of the accident is the highest for (i), and following this, is lowered in the order of (ii), (iii), and (iv). From this result of analysis, it is expected that, when the pedestrian is walking or running in the situation in which the crisis of occurrence of an accident comes near, the pedestrian will continue the current state, i.e., the walking or running state at the highest probability, and that the pedestrian will take the action which probability is lowered in the order of the above-mentioned (i), (ii), (iii), and (iv).

Therefore, in the present embodiment, an action prediction model which represents the action of the above-mentioned (i) to (iv,) with probabilities is previously stored in the action prediction data base 26 as the pedestrian action prediction model, and when a pedestrian is detected as an obstacle as later described, the future action of the pedestrian is predicted by the control apparatus on the basis of the pedestrian action prediction model stored in the action prediction data base. According to the result of analysis of the pedestrian accidents, it is shown that a number of pedestrians who encountered an accident had continued the state of movement just before the accident, thus as the pedestrian action prediction model, only the model which predicts that the pedestrian continues the state of movement just before the accident may be used, or the model which predicts that the pedestrian continues the state of movement just before the accident may be mainly used, other models being used as auxiliary ones.

In addition, when the pedestrian is sleeping on the road, when the pedestrian is dead drunk, and when pedestrian is wandering about, it is predicted that the current state is maintained even as the future action, thus in the action data base 26, a prediction model which represents that such a current state is continued is also stored.

In addition, the control apparatus 24 is connected to a brake hydraulic pressure circuit 30, and to the brake hydraulic pressure circuit 30, a hydraulic pressure sensor 30A which detects the braking force by detecting the hydraulic pressure for the master cylinder (the master cylinder pressure) which is in proportion to the pressure given by the driver depressing the brake pedal is mounted. The hydraulic pressure sensor 30A is connected to the control apparatus 24 so as to input the master cylinder pressure detected.

Figure 9:
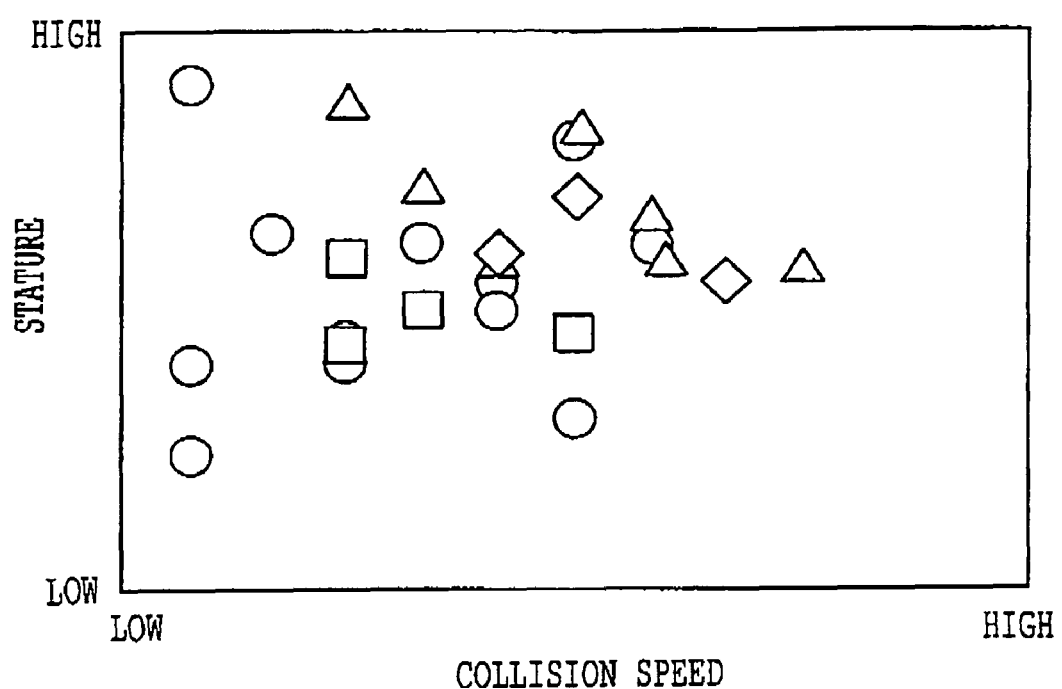
FIG. 9 is a figure indicating the types of pedestrian behavior at the time of collision in correspondence to the collision speed and the stature of the pedestrian.

As a result of the present inventor et al. having analyzed the accident investigation data in detail to investigate the pedestrian behavior at the time of accident, it has been revealed that the pedestrian behavior at the time of collision greatly varies depending upon the collision speed, the stature, the vehicle front portion geometry, and the like, as shown in FIG. 9. In the analysis, the behaviors of the pedestrians at the time of collision were classified into the four categories: collision fell, run over, collision bumped up, and collision bumped off. As shown in FIG. 9, when the collision speed is low, the behavior following the collision is mainly the falling behavior, and the probability of being bumped up onto the hood is low. On the other hand, when the collision speed is high, the pedestrian is bumped up onto the hood before dropping onto the road surface. In addition, in the intermediate region in these speed zones, these behaviors coexist.

FIG. 10 shows the result of investigation of the injury situations for each of the types of pedestrian behavior at the time of collision as indicated in FIG. 9. According to the result of analysis as shown in FIG. 10, it can be seen that, when the pedestrian is bumped up onto the hood after the collision, the rate of the head and face site being injured by dropping from the hood is particularly high. Similarly, it has been comprehended that, also in the other types of collision behavior, the rate of the head and face site being injured by collision against the road surface is high.

In the present embodiment, on the basis of the above-mentioned result of analysis, in order to prevent the pedestrian having been bumped up in the collision between the vehicle and the pedestrian from dropping to collide against the road surface, resulting in the head and face site being injured, a pedestrian protection apparatus which, by controlling the behavior of the pedestrian at the time of collision, suppresses the pedestrian from being bumped up onto the hood of the vehicle body to prevent the pedestrian from dropping from a high to the road surface is provided.

As shown in FIG. 3 to FIG. 6, a pair of pedestrian protection apparatuses 40 is provided at the front face of the vehicle.

Each of this pedestrian protection apparatuses 40 is composed of an air bag element 40A which is accommodated in the bumper of the vehicle, being folded, and is extended and developed with an inflator being operated, and a plate-like pedestrian behavior control section 40B which is anchored to the air bag element 40A, being made of an elastic element, such as rubber, or the like. The respective pedestrian protection apparatuses 40 are capable of separately operating the inflator to develop the pertinent air bag element 40A. The respective inflators, which constitute the operation section of the pedestrian protection apparatus 40, are connected to the control apparatus 24.

Figure 4:
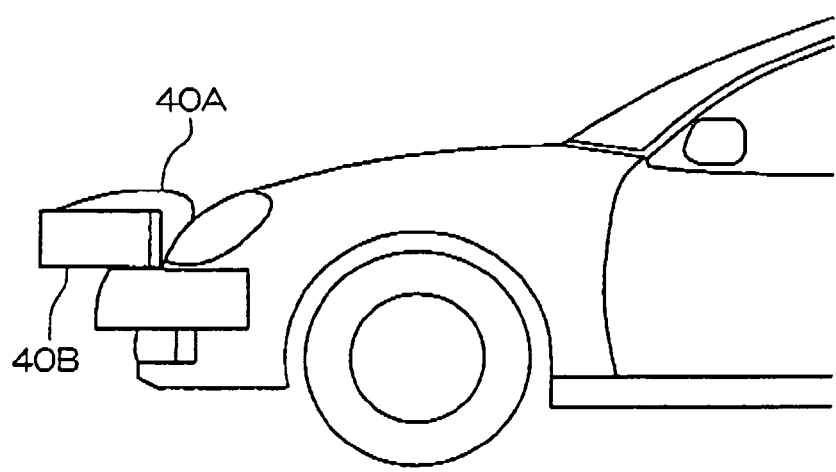
FIG. 4 is a side view illustrating the state of the pedestrian protection apparatus being developed.
Figure 5:
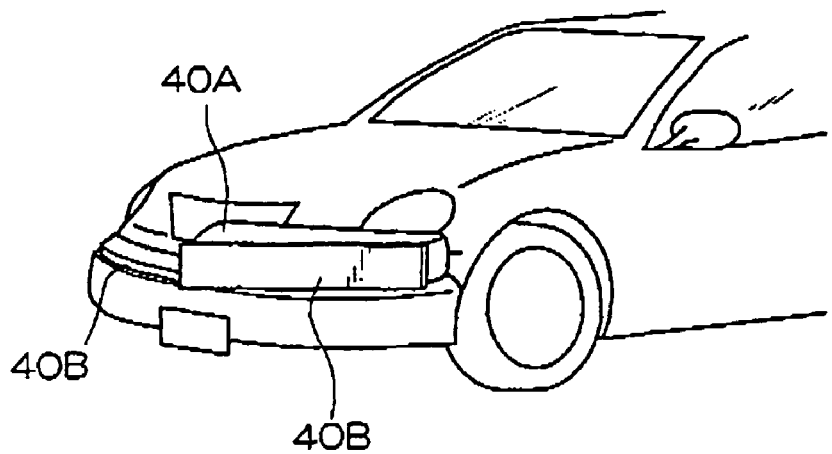
FIG. 5 is a perspective side view illustrating the state of the pedestrian protection apparatus being developed.
Figure 6:
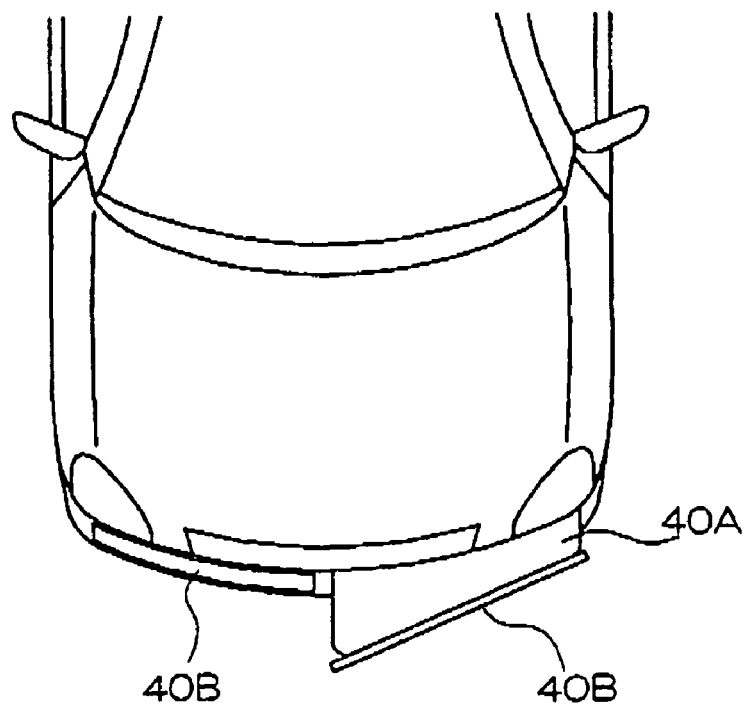
FIG. 6 is a plan view illustrating the state of the pedestrian protection apparatus being developed.

This pedestrian behavior control section 40B is positioned flush with the top of the bumper in the state in which the air bag element 40A is folded to be accommodated in the bumper, but as shown in FIG. 4 to FIG. 6, when the air bag element 40A is developed, the vehicle central side of the pedestrian behavior control section 40B is more projected toward the vehicle front than the vehicle lateral side is, and the top of the pedestrian behavior control section 40B is directed to the vertical direction. Therefore, the pedestrian positioned in front of the vehicle can be pushed in a lateral direction of the vehicle with the pedestrian behavior control section 40B to control the behavior of the pedestrian in collision for prevention of the pedestrian from being bumped up onto the vehicle hood.

Hereinabove, an example in which a single plate-like pedestrian behavior control section is used to constitute a pedestrian protection apparatus has been described, but a plurality of plate-like pedestrian behavior control sections disposed along a vehicle width direction may be used. In this case, the pedestrian behavior control section on the vehicle central portion side is sized larger than the pedestrian behavior control section on the vehicle lateral side.

In addition, the pedestrian behavior control section may be mounted to the end of the accumulator to change the mounting angle by controlling the extension of the accumulator. Further, the pedestrian behavior control section may also be disposed in the vertical direction of the vehicle, being divided, for control of the pedestrian behavior.

Figure 7:
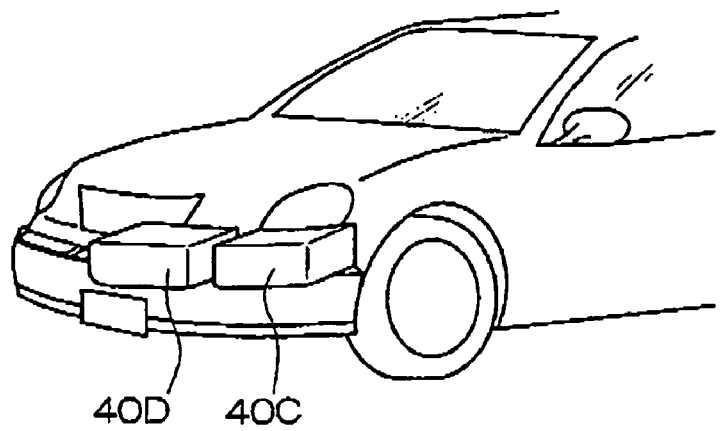
FIG. 7 is a perspective side view illustrating the state of another pedestrian protection apparatus being developed.
Figure 8:
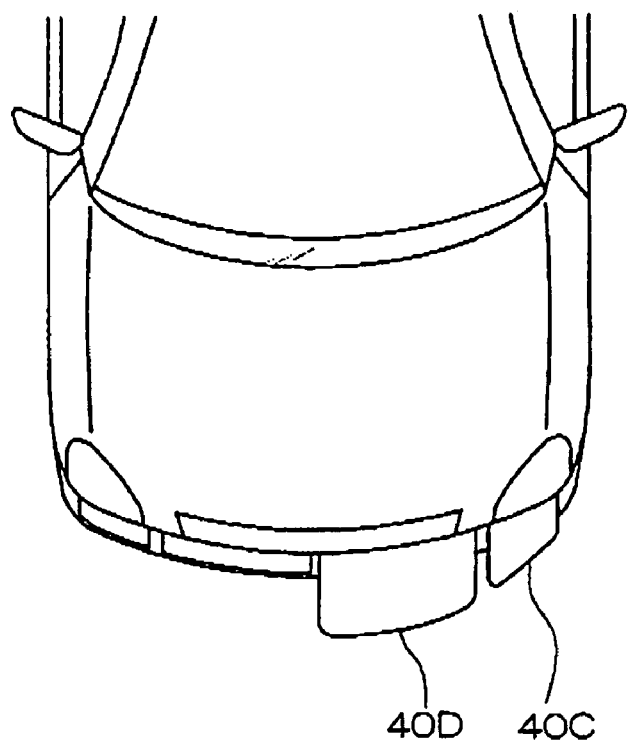
FIG. 8 is a plan view illustrating the state of another pedestrian protection apparatus being developed.

Hereinabove, an example in which an air bag element and a pedestrian behavior control section are used to constitute the pedestrian protection apparatus 40 has been described, however, as shown in FIG. 7 and FIG. 8, each of the pedestrian protection apparatuses 40 may be composed of a pair of air bag elements 40C, 40D which are accommodated in the bumper, being folded, and are extended and developed by the operation of the inflator. The capacity of the air bag element 40D on the vehicle central portion side is larger than that of the air bag element 40C on the vehicle lateral side, and in the state in which the air bag elements 40C, 40D are developed, the air bag element 40D on the vehicle central portion side is more protruded toward the vehicle front than the air bag element 40C on the vehicle lateral side is, thus in the same way as described above, the pedestrian positioned in front of the vehicle can be pushed in a lateral direction of the vehicle to control the pedestrian behavior after collision for prevention of the pedestrian from being bumped up onto the vehicle hood.

The geometry of the air bag element may be cubic, column pillow, or spherical. Hereinabove, an example in which a plurality of air bag elements are used has been described, however, a single air bag element may be used in the same manner as in FIG. 3 to FIG. 6.

When a plurality of air bag elements are used, the development state can be changed by controlling the inflator pressure or flow rate for the air bag elements.

In addition, the bag support portion may be mounted to the end of the accumulator to change the mounting angle by controlling the extension of the accumulator. Further, the air bag element may also be disposed in the vertical direction of the vehicle, being divided, for control of the pedestrian behavior.

Figure 13:
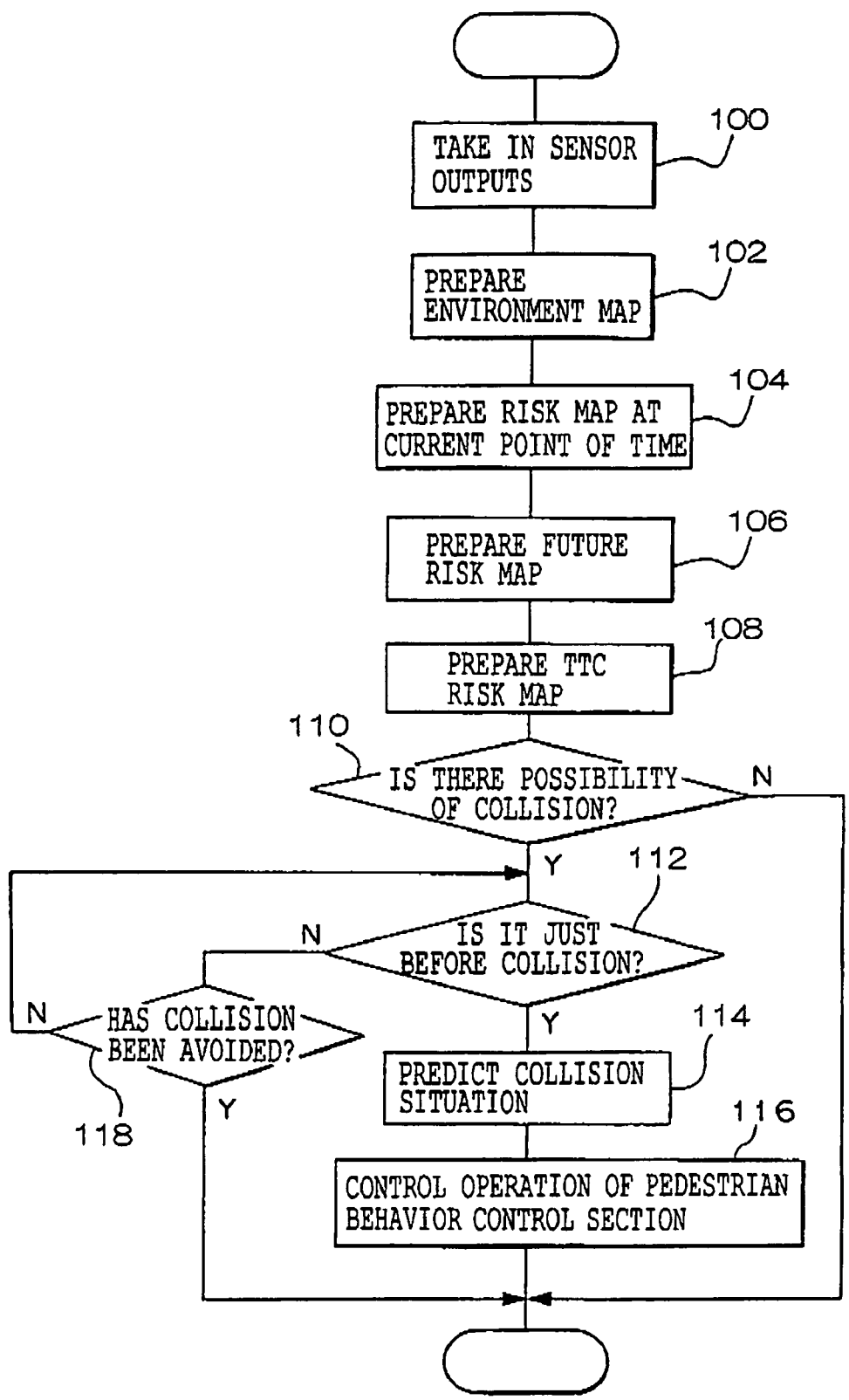
FIG. 13 is a flowchart illustrating a control routine which controls the pedestrian protection apparatus of the first embodiment.

Next, a control routine which is stored in the control apparatus for controlling the pedestrian protection apparatus of the present embodiment will be described with reference to FIG. 13.

First, at step 100, the data detected by the sensors for detecting the running state of the driver's own vehicle, and the sensors for detecting the environmental state is taken in, and at step 102, on the data detected by the sensors for detecting the environmental state, and by referencing the position of the driver's own vehicle inputted from the GPS apparatus 22, an environment map including the road geometry, and an obstacle, such as the pedestrian, and the like, is prepared using the map information which is stored in the map data base 34. In the environment map, the position of the pedestrian is displayed as an obstacle, thus from the environment map, the relative position between the driver's own vehicle and the pedestrian can be determined.

In preparing an environment map, a map for the driver's own vehicle front side is prepared on the basis of the data from the front camera and the laser radar; a map for the driver's own vehicle lateral side is prepared on the basis of the data from the side camera; a map for the driver's own vehicle rear side is prepared on the basis of the data from the rear camera; and by synthesizing these front side map, lateral side map, and rear side map, an environment map for the whole is prepared.

For the map for the driver's own vehicle front side, by using the distance data from the driver's own vehicle to the obstacle in front, and the data indicating the direction of presence of the obstacle referenced to the driver's own vehicle that have been taken in from the laser radar 20, and the image data for the driver's own vehicle front that has been inputted from the camera 18, and by edge processing of the image portion including the position (the distance from the driver's own vehicle to the obstacle), and the like, the subject existing in the position detected by the laser radar 20 is extracted as an obstacle. Then, a map is prepared such that the obstacle extracted is located in the position detected by the laser radar 20.

Because the obstacle is extracted by image processing of the image portion including the position detected by the laser radar 20, the size and type, and the like, of the obstacle can be detected besides the position which has been detected by the laser radar. Thereby, a pedestrian crossing in front of the driver's own vehicle, a motor cycle running in front of the driver's own vehicle, and the like are extracted as obstructs. When the obstacle is a pedestrian, by detecting the pedestrian information (the pedestrian's attributes), such as the age, the gender, whether the pedestrian has belongings, the direction of the line of sight, and the like, in addition to said size (stature and weight), and predicting the change in the position of the pedestrian, and the like, the movement of the pedestrian and the will of the pedestrian, such as in which direction the pedestrian intends to move, or the like, can be predicted.

The pedestrian information may be sent by the road-to-vehicle communication from the environment sensors provided for the road side to the vehicle side, or by causing the pedestrian to have a wireless tag in which the pedestrian information is stored, may be sent from the wireless tag to the vehicle side.

For the map for the driver's own vehicle rear side, by image processing, such as pattern matching, or the like, of the image data from the rear camera which photographs the driver's own vehicle rear, other vehicles which approach from the rear of the driver's own vehicle on the same lane as that for the driver's own vehicle and the lane adjacent to the lane for the driver's own vehicle are extracted, and a map including the other vehicles extracted is prepared. The map for the driver's own vehicle lateral side can also be prepared in the same way as that for the driver's own vehicle rear side.

FIG. 14 shows an example of the environment map prepared as described above. On the front side of the driver's own vehicle in the environment map, a front vehicle $h_1$, which is an obstacle extracted, and a pedestrian $h_2$ are displayed; on the rear side of the driver's own vehicle, a rear vehicle $h_3$ is displayed; in the region including the vehicle lateral side, a median strip 36, and guard rails 38 are displayed; and between the guard rails 38, a free space into which a vehicle can advance is displayed. Further, on the left lateral side with respect to the running direction of the front vehicle, a dead angle region d which is difficult to be detected by the sensors is produced. The dead angle region d is a region, such as a lee, or the like, which cannot be sensed with a camera or a laser radar, and such region may also be produced by a sensor fault due to the weather getting worse.

Figure 16:
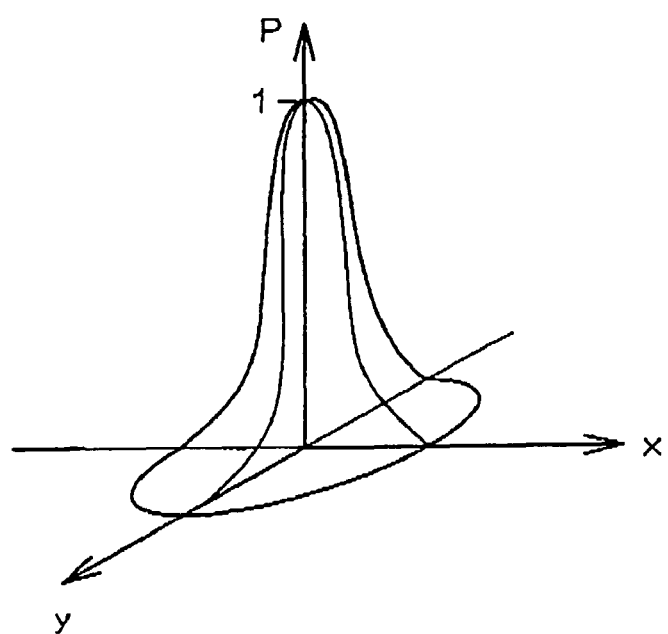
FIG. 16 is a figure illustrating the distribution of the probability of presence.

At the next step 104, using the environment map which displays obstacles, being prepared as described above, a risk map which represents the risk at the current point of time according to the type of the obstacle is prepared. The risk map is represented by providing the environment map with the hazardous region (the risk region) and the degree of risk (the risk) which is prescribed in steps in the inside of the risk region. As shown in FIG. 16, the respective sets of positional coordinates (x, y) in the risk map are provided with a probability P (a value of 0 to 1) of presence of an obstacle, assuming that the position where the obstacle exists is 1, such that it is distributed, being gradually decreased to 0, and the region where the value of probability of presence exceeds 0 is displayed as the risk region. The basic risk which corresponds to the type of obstacle is provided, with the degree being changed in accordance with the type of obstacle (for example, a pedestrian is provided with a higher degree of risk than is given to a vehicle running in the opposite lane), and even for obstacles of the same type, it may be provided in a plurality of steps. In the present embodiment, the risk was provided in three steps of high, medium, and low, being numericalized (for example, 3 for high, 2 for medium, and 1 for low).

Figure 17:
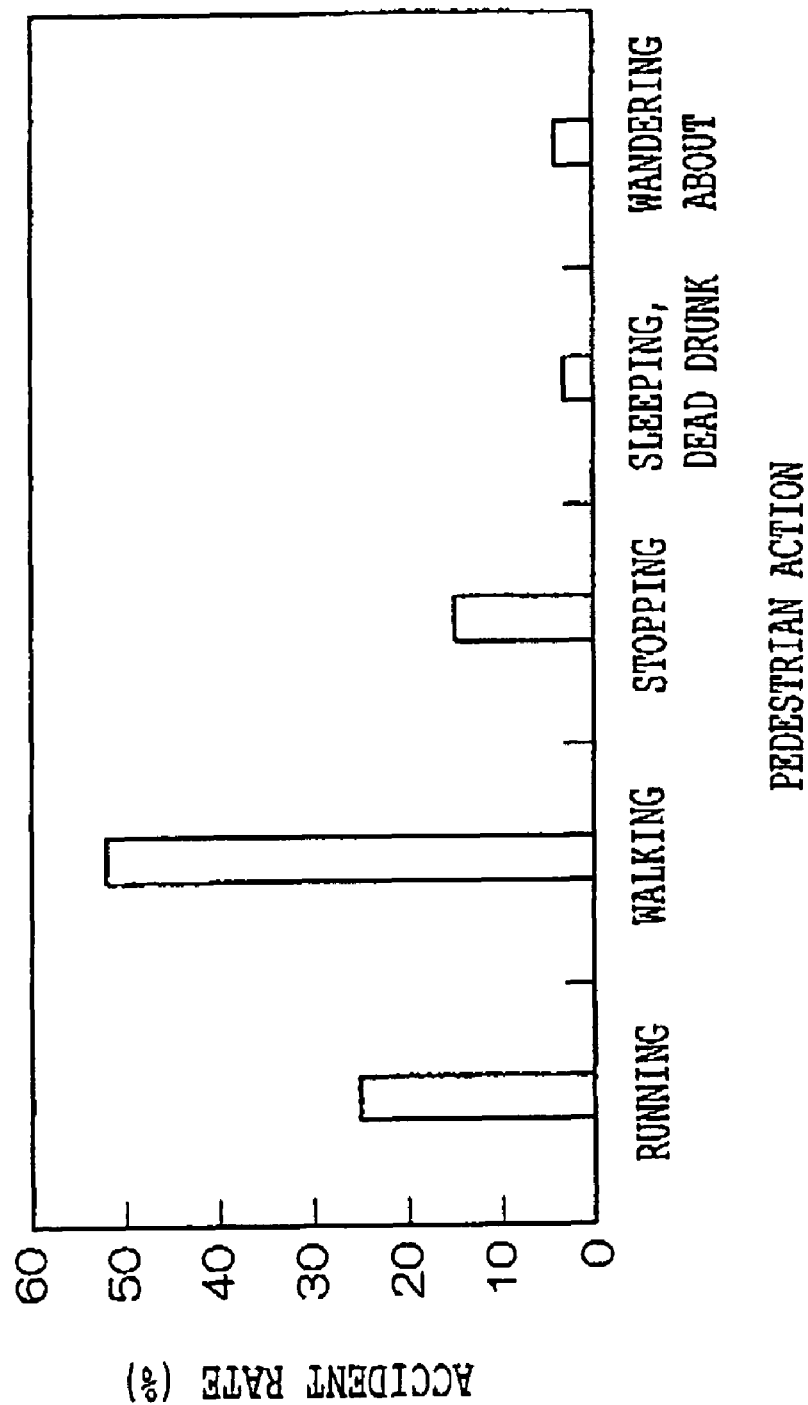
FIG. 17 is a figure showing the result of analysis of the action of the pedestrian at the time of accident from the accident investigation data.

FIG. 17 shows the result of analysis of the action of the pedestrian at the time of accident from the accident investigation data. As shown in the figure, as the action of the pedestrian, the walking action occupies over 50%, and the actions of running, stopping, and the like give lower rates. Therefore, the actions of the pedestrians can be classified into three broad general categories: walking, running, and others.

Table 1 gives an arrangement on the basis of this classification for each road environment.

TABLE 1

| Form of road Action | Pedestrian | | | | | |
|---|---|---|---|---|---|---|
| | Right to left (when viewed from vehicle) | | | Left to right (when viewed from vehicle) | | |
| | Walking | Running | Stop, dead drunk, or the like | Walking | Running | Stop, dead drunk, or the like |
| Straight advance | A | A | C | A | B | C |
| Crossing point straight advance | B | C | C | C | C | 0 |
| Crossing point right turn | B | C | C | C | C | 0 |
| Crossing point left turn | 0 | C | 0 | C | 0 | 0 |

A: Accident rate is high
B: Accident rate is medium
C: Accident rate is low

This table gives the rate of occurrence of accident for each road environment and pedestrian action in three steps of high, medium, and low, and according to the result of Table 1, it can be understood that the probability of an pedestrian who is walking being encountered with an accident is the highest in case when the pedestrian crosses a straight advancement road from right to left.

In addition, examination of the rate of occurrence of pedestrian accident for each time zone from the result of analysis of the accident investigation data has revealed that the accident occurrence rate is increased from sunset; is maintained at high level at night time; and is lowered with sunrise. Further, it is also known that the accident occurrence rate varies depending upon the weather.

Therefore, assuming that the probability of presence of an obstacle is P, and the basic risk (the initial value) corresponding to the type of the obstacle is $D_0$, the final risk D is calculated by the following formula, using, as the correction factors, a correction value $H_1$, which corresponds to the predicted action of the obstacle, a correction value $H_2$, which corresponds to the accident occurrence rate, and a correction value $H_3$, which corresponds to the weather.

$$D = P \cdot D_0 \cdot H_1 \cdot H_2 \cdot H_3 \quad (1)$$

Prediction of the action of the obstacle can be performed on the basis of the action prediction model stored in the action prediction data base, and for pedestrian, because, from FIG. 17, the accident rates for running and walking are higher than that for stopping, the correction value $H_1$ for walking and running is set at a higher value than is set for stopping, with the probability of the current action being continued being predicted to be high.

Determination of the state of the pedestrian can be performed by means of a camera, or the like, which is an external environment sensor. For example, when an obstacle on the road surface is 30 cm or so, which is equivalent to the human body thickness, and the lateral width is 1 to 2 m or so, with the heat generation being detected by the infrared camera, or the like, it can be determined that the pedestrian is lying down (sleeping) on the road surface. Or, when the path of advancement and the speed of movement of the pedestrian irregularly vary, it can be determined that the pedestrian is dead drunk, or is wandering about.

In addition, for the correction value $H_2$, from the information about the map around the driver's own vehicle that has been obtained by the GPS apparatus, the road geometry is determined, with the current action of the pedestrian being determined by image processing the image which has been photographed by the camera; on the basis of Table 1, the accident occurrence rate which corresponds to the road geometry and the action of the pedestrian is determined; and the value of $H_2$ is set such that it corresponds to the accident occurrence rate determined. In this case, the higher the accident occurrence rate, the higher the risk is, thus, the higher the accident occurrence rate, the higher the value at which the correction value $H_2$ is set.

In addition, the correction value $H_3$ which corresponds to the weather is set according to the weather detected by the weather sensor and the time, and when one fine weather day is assumed to be a unit, is set such that it is increased from sunset to night time; is maintained at high level at night time; and is lowered with sunrise. In addition, for a rainy day, a correction value which provides a higher risk than is given by the correction value for the fine weather day is set. The action of the pedestrian may vary depending upon the road environment, the weather, and the time zone, thus by correcting the predicted action on the basis of the information about the road environment, the weather, and the time zone, the accuracy of prediction of the risk can be enhanced.

Figure 15:
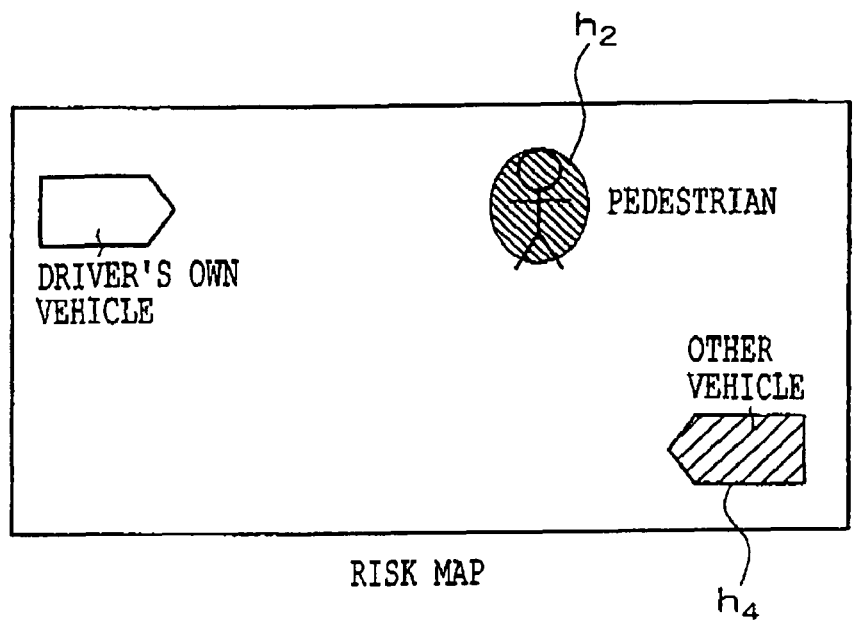
FIG. 15 is a figure showing an example of risk map which represents the risk region and the risk.

FIG. 15 shows an example of risk map which represents the risk region and the basic risk by overlaying them on the environment map on which a pedestrian $h_2$ and a vehicle running in the opposite lane, $h_4$ are displayed as obstacles. Among the types of obstacle, the pedestrian is the highest in risk, thus the basic risk for the pedestrian is set at the highest value (high in the present embodiment). For the vehicle running in the opposite lane, the probability of presence is high in the direction of running, thus a risk region which major axis is along the direction of running and the basic risk (in the present embodiment, medium, which is lower than the risk for the pedestrian) are provided.

Figure 18:
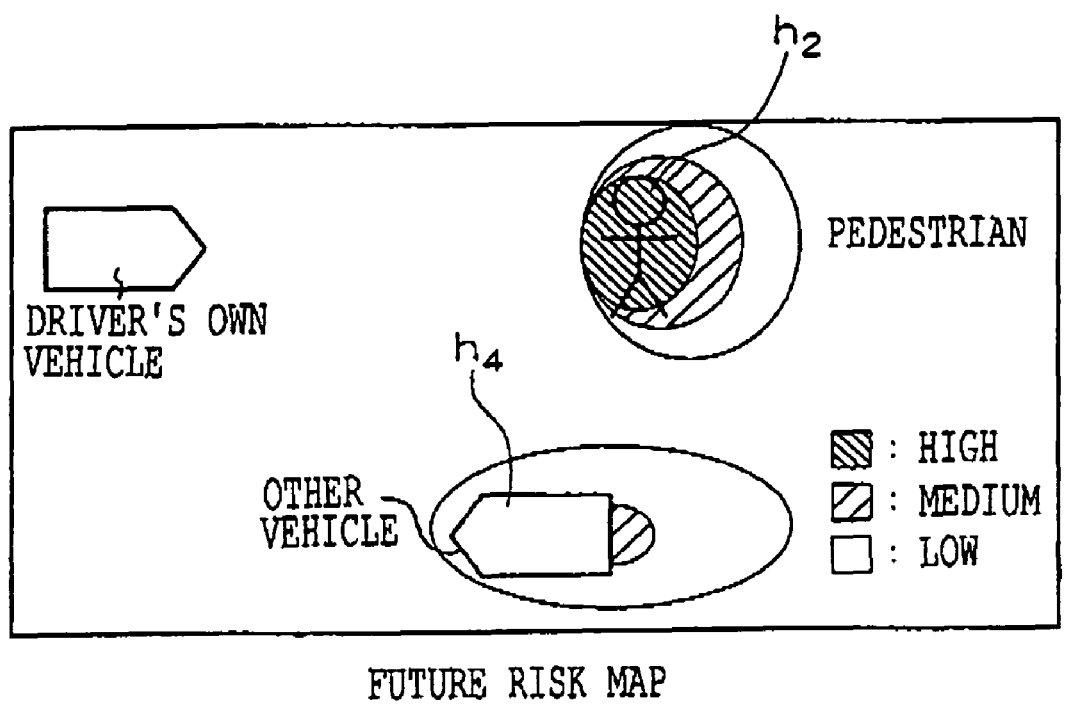
FIG. 18 is a figure showing an example of fixture risk map.

At the next step 106, on the basis of the risk map at the current point of time, the action prediction data base which stores data for predicting the action of an obstacle including the data indicating the probability of presence of an obstacle that corresponds to the time; and the expected distance after a prescribed period of time (T sec) between the driver's own vehicle and the obstacle, a future risk map which indicates the probability of presence of an obstacle after T sec, and the risk for the obstacle after T sec from the current point of time (a risk map represented by a time function) is prepared as shown in FIG. 18.

The future risk map is prepared by estimating the position of an obstacle after T sec from the movement speed information (the speed vector information) for the obstacle. In other words, when an obstacle is moving, the position of the obstacle after T sec can be estimated from the movement speed information for the obstacle, thus a future risk map is prepared according to the position of the obstacle that has been estimated from the movement speed information.

In addition, there is a possibility that the movement speed information for the obstacle is changed, resulting from that the pedestrian or the vehicle running in the opposite lane takes an avoidance action in response to the current hazardous situation, or the like. Therefore, from the information about the movement speed of the obstacle at the current point of time, the speed of the driver's own vehicle, the relative position between the driver's own vehicle and the obstacle, and the like; on the basis of the data, such as the action prediction model, and the like, which are previously stored in the action prediction data base; and from the possibility that the obstacle takes an avoidance action, the estimated position after T sec when the avoidance action has been taken, and the like, the position of the obstacle after T sec is determined as a distribution of the probability of presence of a map, and further by numericalizing the risk possessed by the obstacle in the same manner as described above (for example, giving 3 for high, 2 for medium, and 1 for low), and multiplying it by the probability of presence, a risk map after T sec is prepared.

Assuming that an obstacle detected at the current point of time is existing, the region in which there is a possibility that the obstacle exists is widened according to the action of the obstacle after T sec when the obstacle has moved, thus the risk region in the future risk map to be provided for the obstacle which is moving is further widened. In addition, it is predicted that, by a motion, or the like, to avoid the obstacle detected, the risk is decreased, thus the risk is provided such that it is lower in an outer risk region than in an inner one.

In an example of future risk map as shown in FIG. 18, for the pedestrian $h_2$, the risk regions are provided such that they are gradually enlarged from the current risk taken as the reference, and the risks for the respective risk regions are provided such that they are gradually lowered from the current risk taken as the reference. Also for the vehicle running in the opposite lane, $h_4$, the risk regions and the risks are provided in the same manner as for the pedestrian $h_2$, the region in which there is a possibility of existence being widened, and the risk region being also widened, with the possibility of the avoidance action, such as braking, or the like, of the vehicle running in the opposite lane, $h_4$, being taken into account.

In addition, when the obstacle is a pedestrian, at least one of the age and the line of sight in addition to the size (stature) is identified, and on the basis of the result of identification, the probability of presence of the obstacle after said prescribed period of time is compensated for. Thereby, the accuracy of action prediction is improved, and the future risk can be more precisely predicted.

At the next step 108, from the passing time TTC on the locus through which the driver's own vehicle passes with the current state (the vehicle speed and the direction of movement) being held as they are, and the future risk map prepared at step 106, a risk map at the passing time TTC on the locus through which the driver's own vehicle passes is prepared as a TTC risk map. The future risk map is represented as a time function, thus the TTC risk map at the passing time can be prepared from the future risk map and the passing time TTC, and the lower the value of passing time TTC, the higher the risk. For the TTC risk map, by weighting according to the passing time TTC, priority may be given to avoidance of an impending risk.

Herein, the TTC (time to collision) is the time when a predetermined point on the running locus of the driver's own vehicle is reached, and assuming that an obstacle exists on this point, it is the period of time until the driver's own vehicle collides against this obstacle. Assuming that the relative distance from the driver's own vehicle to the obstacle k is Dk; the relative speed of the obstacle k with respect to the driver's own vehicle is Vk; and the variations of the relative distance and the relative speed are a (Dk), σ(Vk), respectively, TTCk for the obstacle k is expressed by the following equation;

$$TTCk=(Dk-\sigma(Dk))/(Vk+\sigma(Vk)) \qquad (2)$$

Figure 19:
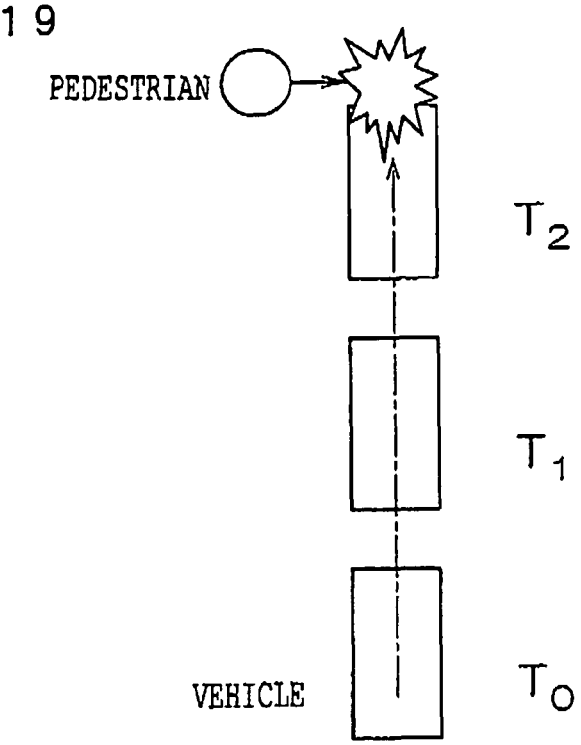
FIG. 19 is an explanatory drawing illustrating the state in which the possibility of collision is determined.

At the next step 110, on the basis of the TTC risk map, the information about the relative position between the pedestrian and the driver's own vehicle, and the current direction of movement and speed of the vehicle, it is determined whether there is a possibility that, when the driver's own vehicle runs on the current running locus, it collides against the pedestrian as an obstacle, i.e., whether the pedestrian can be bypassed. The possibility of collision can be determined by, as shown in FIG. 19, disposing the driver's own vehicle on the TTC risk map which represents the position of the pedestrian with a TTC risk, predicting the position of the driver's own vehicle at the respective times $T_1$ and $T_2$ until the TTC time is reached when the driver's own vehicle runs on the current running locus, determining whether it collides against the pedestrian on the TTC risk map, or whether it goes into the risk region. And, when the pedestrian can be bypassed, even if the driver's own vehicle runs on the current running locus, this routine is ended.

On the other hand, when there is a possibility of collision against the pedestrian, it is determined, at step 112, whether the driver's own vehicle is in the state just before colliding against the pedestrian; and when it is not in the state just before colliding, it is determined, at step 118, whether, by the driver carrying out an avoidance operation, the collision against the pedestrian has been avoided. When, by the driver's avoidance operation, the collision against the pedestrian has been avoided, the need for operating the pedestrian protection apparatus is eliminated, thus this routine is ended.

Examples of the driver's avoidance operation include avoidance operation only by controlling the steering angle; avoidance operation only by braking (deceleration); avoidance operation by braking and steering angle control; avoidance operation only by acceleration; avoidance operation by acceleration and steering angle control; and the like, and these avoidance operations can be detected by means of at least one of the signal from the throttle opening sensor, the signal from the steering angle sensor, and the brake and master cylinder pressure, or a combination of these.

Figure 20:
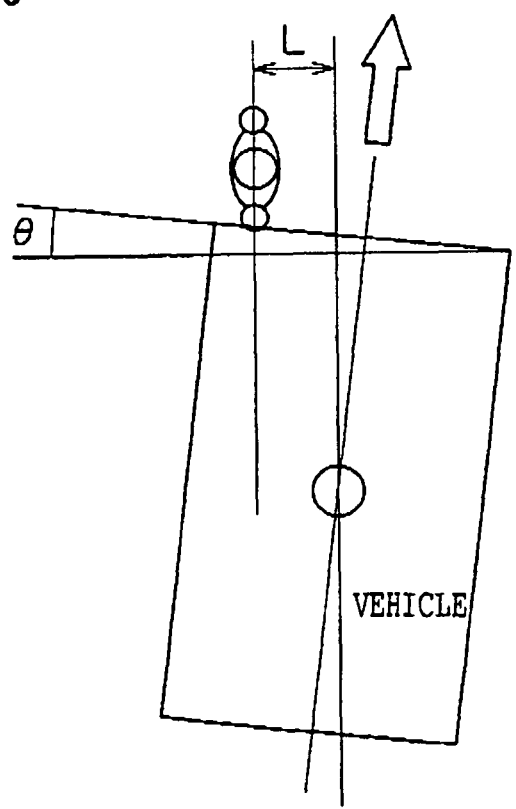
FIG. 20 is an explanatory drawing illustrating the parameters for predicting the collision situation.

When, at step 118, it is determined that the collision against the pedestrian has not been avoided, the program returns to step 112, and repeats determination of whether the driver's own vehicle is in the state just before colliding. When collision against the pedestrian cannot be avoided, in other words, when the driver's own vehicle is in the state just before colliding, the collision situation between the driver's own vehicle and the pedestrian is predicted at step 114 on the basis of the state of the vehicle including the information about the avoidance operation of the vehicle, such as the braking force obtained from the master cylinder pressure, the steering angle, and the like. Examples of the collision situation predicted include the collision relative position L and the relative angle θ between the pedestrian and the vehicle, and the like, as shown in FIG. 20.

At the next step 116, the pedestrian behavior control section of the pedestrian protection apparatus 40 is operated according to the collision situation obtained at step 114 for controlling the collision behavior of the pedestrian such that the pedestrian after the collision is moved to the vehicle side without being bumped up onto the hood. As the control by the pedestrian behavior control section, angle control of the yaw angle and the pitch angle with respect to the pedestrian, and the like, can be mentioned.

When the pedestrian protection apparatus 40 is to be operated, the inflator in the pedestrian protection apparatus 40 is operated to develop the air bag element as shown in FIG. 4 to FIG. 6. Thereby, the pedestrian control section pushes the pedestrian in the lateral direction of the vehicle to control the behavior of the pedestrian at the time of collision, whereby the pedestrian from being bumped up onto the hood of the vehicle body can be suppressed to prevent the pedestrian from dropping from a high to the road surface. In addition, control of the pedestrian behavior is carried out such that, when the pedestrian after the collision collides against the road surface, collision, particularly, of the head and face site against the road surface is avoided, thus the probability that the pedestrian is seriously injured can be lowered. When the pedestrian behavior control is performed by the pedestrian protection apparatus, the pedestrian is not bumped up, but is pushed toward the lateral direction, whereby the pedestrian is moved to the vehicle side to be contacted with the road surface from the body back, which allows the impact force acting on the head of the pedestrian to be alleviated.

The collision situation varies depending upon the avoidance operation by the driver, or the like, thus it is altered every moment on the basis of the avoidance operation information. The alteration is executed until the control of the pedestrian behavior control section collides against the pedestrian, in other words, to the time when the control of the pedestrian behavior control section of the pedestrian protection apparatus is completed.

The pedestrian moves by walking or running, but the walking or running, which is the current movement situation, may be continued in the future, or the state of movement may be abruptly changed. Further, the direction of movement may possibly be abruptly changed, thus it is not easy to predict the future locus by using the action prediction data base. Then, in the present embodiment, the collision situation between this pedestrian protection apparatus and the pedestrian is detected, and the pedestrian protection apparatus is controlled according to the collision situation for controlling the collision behavior of the pedestrian such that the pedestrian after the collision is not bumped up onto the hood, but is moved to the vehicle side. As the control by the pedestrian behavior control section, angle control of the yaw angle and the pitch angle with respect to the pedestrian, and the like, can be mentioned.

In addition, by changing the disposed position in the vertical direction of the pedestrian behavior control section for comparison of the behaviors of the pedestrian, it has been found that, when the pedestrian behavior control section is disposed allow, the portion of the body of the pedestrian that is below the center of gravity thereof collides against the control part surface of the pedestrian behavior control section, thus the pedestrian behavior at the time of collision is such that the pedestrian is bumped up. On the other hand, when the portion of the body of the pedestrian that is above the center of gravity thereof collides against the control part surface, the pedestrian behavior at the time of collision is such that the pedestrian is pressed from above. In this case, the movement of the pedestrian to the vehicle side portion is not caused, but the pedestrian is moved as if the pedestrian were dragged into the lower portion of the vehicle. Therefore, in order to control the behavior of the pedestrian, it is necessary to dispose the control part surface of the pedestrian behavior control section such that it is contacted with the vicinity of the center of gravity of the pedestrian.

Figure 11:
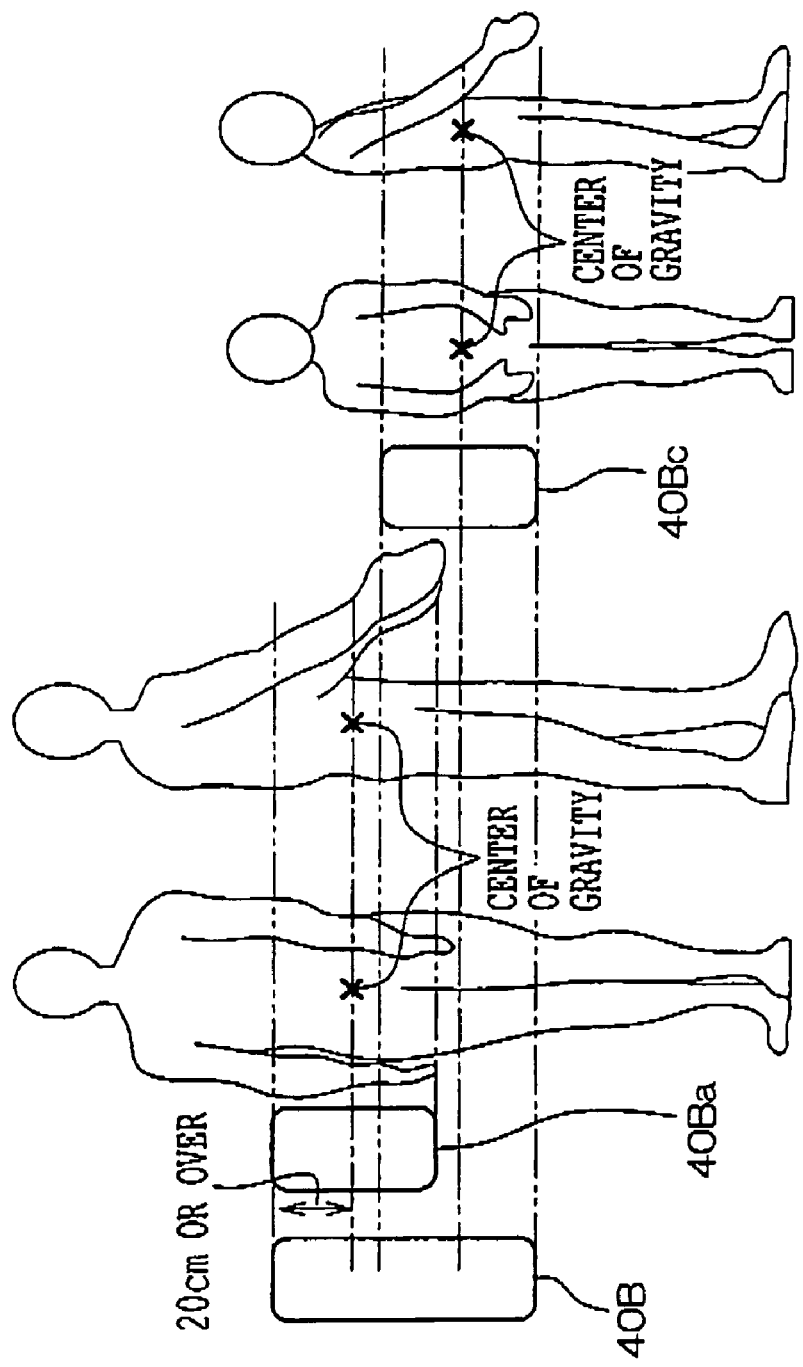
FIG. 11A and FIG. 11B are figures illustrating the positional relationship between the pedestrian behavior control section and the center of gravity of the pedestrian.

FIG. 11 illustrates the positional relationship between the center of gravity of the pedestrian and the pedestrian behavior control section. The pedestrian behavior control section 40B in the present embodiment is formed to have a size which can cover both the body side region including the center of gravity of the child and the body side region including the center of gravity of the adult when the air bag element is developed, such that the behaviors of the child and the adult are controlled, however, a pedestrian behavior control section 40Ba having a size which can cover the body side region including the center of gravity only of the adult, or a pedestrian behavior control section 40Bc having a size which can cover the body side region including the center of gravity only of the child may be used. Or, a size which can cover the body side region including the estimated center of gravity of a bicycle rider may be provided.

Figure 12:
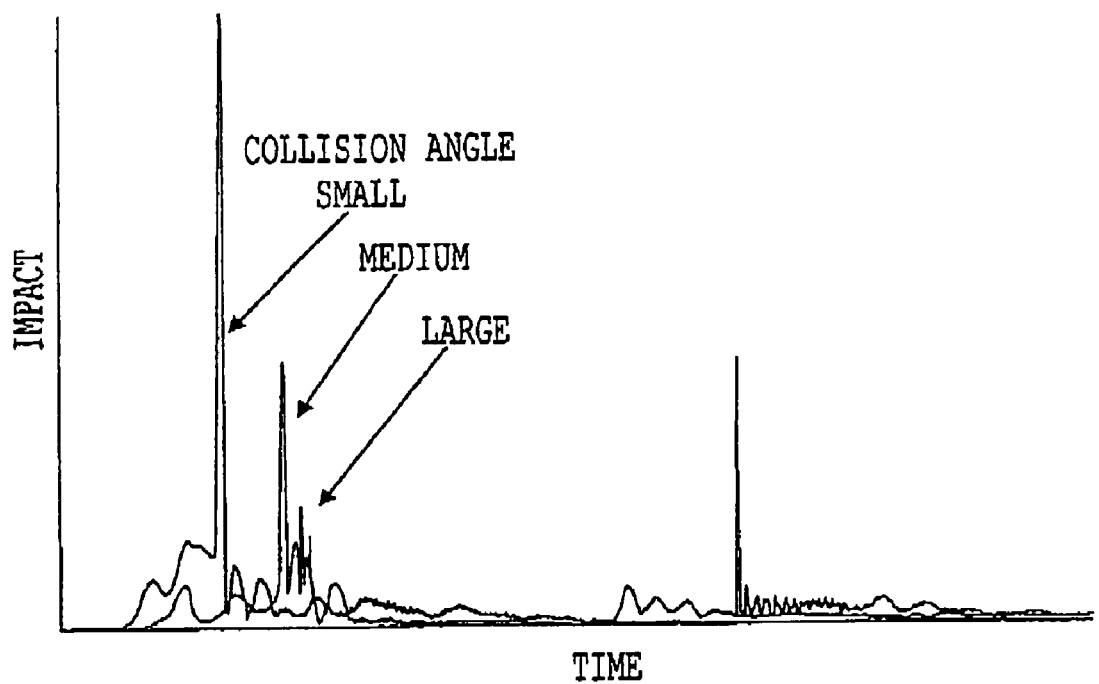
FIG. 12 is a diagram showing the result of investigation of the effect of the impact force on the head when the mounting angle of the pedestrian control section is changed.

The angle at which the pedestrian behavior control section collides against the pedestrian has an effect on the behavior of the pedestrian. FIG. 12 shows the result of investigation of the effect of the impact force on the head when the mounting angle of the pedestrian control section is changed. The result as given in FIG. 12 is that obtained when the collision speed is 40 km/h. According to the result in the figure, the smaller the collision angle between the pedestrian and the control part surface of the pedestrian control section, the higher the peak value of the initial impact force tends to be. On the other hand, at the time of collision against the road surface, the larger the collision angle, the higher the peak value of the impact force tends to be. The cause for this can be considered to be that, when the collision angle is large, the range over which the pedestrian and the control part surface of the pedestrian control section are contacted with each other is widened, which renders the pedestrian behavior easy to be irregular. Therefore, the collision angle of the pedestrian control section is determined in consideration of these.

When the vehicle is taking an avoidance action, the collision angle between the pedestrian behavior control section and the pedestrian is different from that when the vehicle is diametrically opposed to the pedestrian, thus it is preferable that the collision angle be controlled in consideration of the avoidance action of the vehicle. In this case, even when the vehicle is taking an avoidance action, the behavior of the vehicle will not be abruptly changed, thus the collision angle can be determined on the basis of the collision situation of the vehicle and the pedestrian that has been predicted by the collision process prediction means.

According to the accident investigation analysis, a result of analysis that, when the collision speed exceeds 40 km/h, the severity of the injury to which the pedestrian is subjected is increased has been given, however, according to the experiment by the present inventor et al., the pedestrian behavior control by the pedestrian protection apparatus provided an effect of preventing the pedestrian from being bumped up even when the collision speed is 40 km/h, in the same manner as when the collision speed is 25 km/h.

Hereinabove, an example in which, as the pedestrian's attributes, the age, the gender, whether the pedestrian has belongings, and the direction of the line of sight are used has been described, however, at least one of the direction toward which the face is directed, the attitude, and the motion may be added. In the present embodiment, by further adding a probability model of the accident avoidance action of the pedestrian into the pedestrian action prediction model, the risk may be compensated for. In addition, hereinabove, on the basis of the risk estimated, an example in which the integrated control of automatic steering, automatic braking, and automatic driving is performed to avoid an obstacle has been described, however, the selection range for the running avoidance locus of the driver's own vehicle may be widened to alleviate the feeling of incongruity due to the intervention to the driver operation.

As described above, with the pedestrian collision behavior control apparatus of the present embodiment, the pedestrian protection apparatus which controls the pedestrian is disposed on the vehicle front face for controlling the pedestrian behavior after the collision to prevent the pedestrian from being bumped up onto the hood. The control of the pedestrian behavior is carried out on the basis of the vehicle movement information, the collision situation prediction, and the like, for every collision state, which allows the pedestrian behavior to be reliably controlled. In addition, control of the pedestrian behavior is carried out such that, when the pedestrian after the collision collides against the road surface, collision, particularly, of the head and face site against the road surface is avoided, thus the probability that the pedestrian is seriously injured can be lowered. By performing the pedestrian behavior control as described above, an effect of alleviating the impact force imposed on the head of the pedestrian can be obtained.

Next, a second embodiment of the present invention will be described.

Hereinabove, an application where it is difficult to avoid an obstacle and the obstacle is a pedestrian, however, hereinbelow, an application of the present invention to a two-wheeler rider behavior control apparatus which, when it is difficult to avoid an obstacle and the obstacle is made up of any of a bicycle, a motorized bicycle, or an automatic two-wheeler (these hereinafter may be simply called a two-wheeler) and a rider (a two-wheeler rider), controls the collision behavior of the two-wheeler and the two-wheeler rider for protection of this two-wheeler rider will be described.

Figure 21:
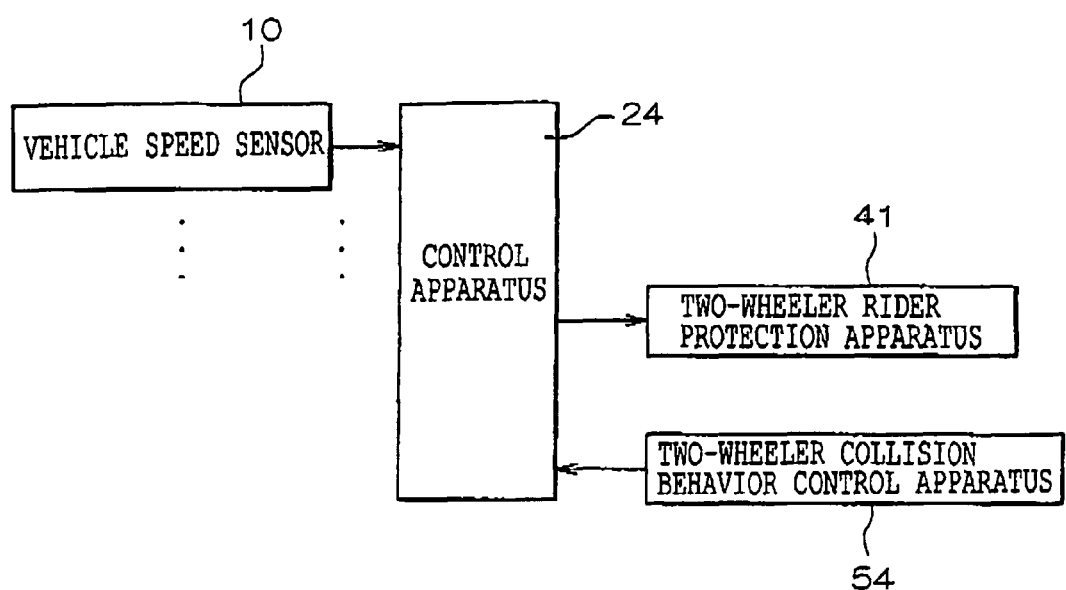
FIG. 21 is a block diagram illustrating the vehicle motion control apparatus of a second embodiment.

In the second embodiment, in order to protect this two-wheeler rider, a two-wheeler rider protection apparatus 41 which comprises a contacting portion disposed in a portion of the front face of a vehicle body, and by using the contacting portion to push a two-wheeler rider separated from the two-wheeler, controls the behavior of the two-wheeler rider is connected to the control apparatus 24 in FIG. 1, as shown in FIG. 21. The two-wheeler rider protection apparatus 41 controls the behavior of the two-wheeler rider such that the two-wheeler rider separated from the two-wheeler is pushed in the lateral direction by the contacting part such that the two-wheeler rider is not bumped up onto the hood of the vehicle body, whereby the two-wheeler rider is moved to the vehicle side.

In addition, to the control apparatus 24, a two-wheeler collision behavior control apparatus 54 is connected which controls the collision behavior of the two-wheeler such that the two-wheeler rider is separated from the two-wheeler by pressing the wheel of the two-wheeler at a portion in the vicinity of the road surface so as to separate between the two-wheeler and the two-wheeler rider. According to the two-wheeler collision behavior control apparatus 54, the behavior of the two-wheeler is controlled such that the two-wheeler rider is separated from the two-wheeler, and is moved toward the vehicle front with a low posture without being bumped up onto the vehicle hood.

In addition, as with the pedestrian protection apparatus as described in the first embodiment, the two-wheeler rider protection apparatus 41 is composed of an air bag element comprising a contacting portion and an inflator which supplies gas to develop this air bag element. The air bag element is accommodated in the bumper of the vehicle, being folded, and the inflator in the two-wheeler rider protection apparatus 41 is connected to the control apparatus.

For the two-wheeler collision behavior control apparatus 54 and the two-wheeler rider protection apparatus 41, the two-wheeler rider protection apparatus 41 in which the function of the pedestrian protection apparatus 40 is included or the pedestrian protection apparatus 40 in which the function of the two-wheeler rider protection apparatus 41 is included may be disposed together with the two-wheeler collision behavior control apparatus 54, however, they may be disposed together with the pedestrian protection apparatus 40 as described above. The configuration of the components other than the two-wheeler collision behavior control apparatus and the rider protection apparatus in FIG. 21 is the same as FIG. 1 or as described above in the first embodiment, thus in FIG. 21, only the vehicle speed sensor in FIG. 1 is shown, and drawing the other sensors, and the like, is omitted.

The two-wheeler collision behavior control apparatus is composed of a two-wheeler collision behavior control element, and a driving apparatus, such as an inflator, or the like, which is driven so as to move the tip portion of the two-wheeler collision behavior control element toward the wheel of the two-wheeler. The two-wheeler collision behavior control element may be composed using an air bag element 56, which developed state is illustrated in FIG. 24A, or a two-wheeler pressing apparatus 64 as shown in FIG. 24B and FIG. 24C.

The air bag element 56 as shown in FIG. 24A is accommodated in the lower portion of the bumper 58 of the vehicle, being folded, with a two-wheeler contacting part which is to be contacted with a two-wheeler being formed at the tip part. To the air bag element 56, an inflator for supplying gas to the air bag element 56 is connected. With the inflator being operated, and the gas being supplied to the air bag element, the air bag element 56 is extension developed, and in the state in which it is extension developed, a wheel portion of the two-wheeler in the vicinity of the road surface is pressed by the two-wheeler contacting part formed at the tip part of the air bag element 56 as shown in FIG. 24A. Thereby, the two-wheeler rider is separated from the two-wheeler.

The two-wheeler pressing apparatus 64 as shown in FIG. 24B and FIG. 24C is configured to include a pair of extension and contraction rods 60 which functions as a pushing-out part; a driving apparatus 61 which is disposed in the lower portion of a bumper 58 so as to extend each of the pair of extension and contraction rods 60; and a plate-like two-wheeler contacting part 62 which is connected to the tip of the pair of extension and contraction rods 60. According to this two-wheeler pressing apparatus 64, the driving apparatus 61 is driven for extending each of the pair of extension and contraction rods 60, whereby the two-wheeler contacting part is protruded to press a wheel portion of the two-wheeler in the vicinity of the road surface. In addition, by controlling the amount of extension of the respective extension and contraction rods 60, the angle of the two-wheeler contacting part can be adjusted.

In addition, as the pushing-out part for pushing out the two-wheeler contacting part, a cylinder which is extended and contracted by air pressure or hydraulic pressure may be used instead of the extension and contraction rod. Further, the pushing-out part may be configured such that it utilizes the resilience of the elastic force of a spring, or the like, as a modification of the pushing-out part, or the force of a shape memory alloy, or the like, to push out the two-wheeler contacting part. The two-wheeler contacting part 62 may be configured by wrapping or bonding a woven cloth around/to a thin steel sheet or a plastic sheet.

Hereinabove, an example in which the two-wheeler contacting part and the pushing-out part are connected to each other, however, air pressure, hydraulic pressure, elastic force, or the like may be utilized to separate the two-wheeler contacting part from the vehicle and cause it to fly from the vehicle front to the wheel of the two-wheeler.

The two-wheeler collision behavior control element may also be disposed in the bumper upper position, besides the bumper lower position as described above; may be accommodated inside the bumper; or may be disposed at the front grille or the hood front end portion. Or, it may be disposed at the head light, or a part of the turn indicator, or the like.

With this two-wheeler collision behavior control apparatus, when an approach of a two-wheeler is sensed by the sensor disposed in the vehicle, and from the relative speed difference obtained as described above, it is determined that collision is difficult to be avoided, the two-wheeler collision behavior control element is pushed out. Thereby, at the time of collision, the two-wheeler contacting part of the two-wheeler collision behavior control element is brought into contact with the two-wheeler to separate between the two-wheeler and the two-wheeler rider for controlling the collision behavior of the two-wheeler. In addition, at the same time, the two-wheeler rider protection apparatus 41 is controlled for controlling the collision behavior such that the two-wheeler rider is moved to the vehicle side. By thus controlling the collision behavior of the two-wheeler with the two-wheeler rider being separated, the two-wheeler rider can be prevented from being sandwiched between the two-wheeler and the vehicle.

If an air bag element for protection of two-wheeler rider is further provided in the hood at the front of the vehicle, when the two-wheeler rider separated from the two-wheeler is moved toward the vehicle hood, the impact on the two-wheeler rider at the time of collision can be reduced to protect the two-wheeler rider.

Hereinbelow, the result of examination about the two-wheeler collision control and the rider collision behavior control carried out to demonstrate the efficacy of the present embodiment using a two-wheeler simulation model as shown in FIG. 23 is given. Hereinbelow, the case where, as the two-wheeler collision control element, an air bag element is used will be described.

For the two-wheeler collision behavior control element, the vertical position from the road surface at which the air bag element is to be developed is different, because the pedestrian and the two-wheeler differ from each other in position of the center of gravity. In other words, for the pedestrian, after an approximate position of the center of gravity being estimated on the basis of the stature, the development position of the air bag element in the vertical direction, while, for the two-wheeler, the saddle position of the two-wheeler or the tire diameter of the two-wheeler is used as an approximate calculation reference. This is because, as shown in FIG. 23, the two-wheeler rider performs driving, having a seat on the saddle, thus it can be considered that the position of the center of gravity of the rider is also in the vicinity of above the saddle. Therefore, after the saddle position of the two-wheeler being measured using a sensor as external environment detection means, or the saddle level being estimated by measuring the tire diameter, the development vertical position of the air bag element is determined.

Although the connection between the two-wheeler and the rider is not firm, the behavior of the two-wheeler rider at the time of collision is not a little affected by the two-wheeler behavior, thus the development direction, the development force, the development timing, and the like, are adjusted on the basis of the expected collision angle and collision speed between the vehicle and the two-wheeler, and the like, and the air bag element for the two-wheeler collision behavior control element is developed to press the two-wheeler such that the two-wheeler rider is capable of being moved to the vehicle side by pushing the two-wheeler rider with the two-wheeler rider protection apparatus.

Figure 22:
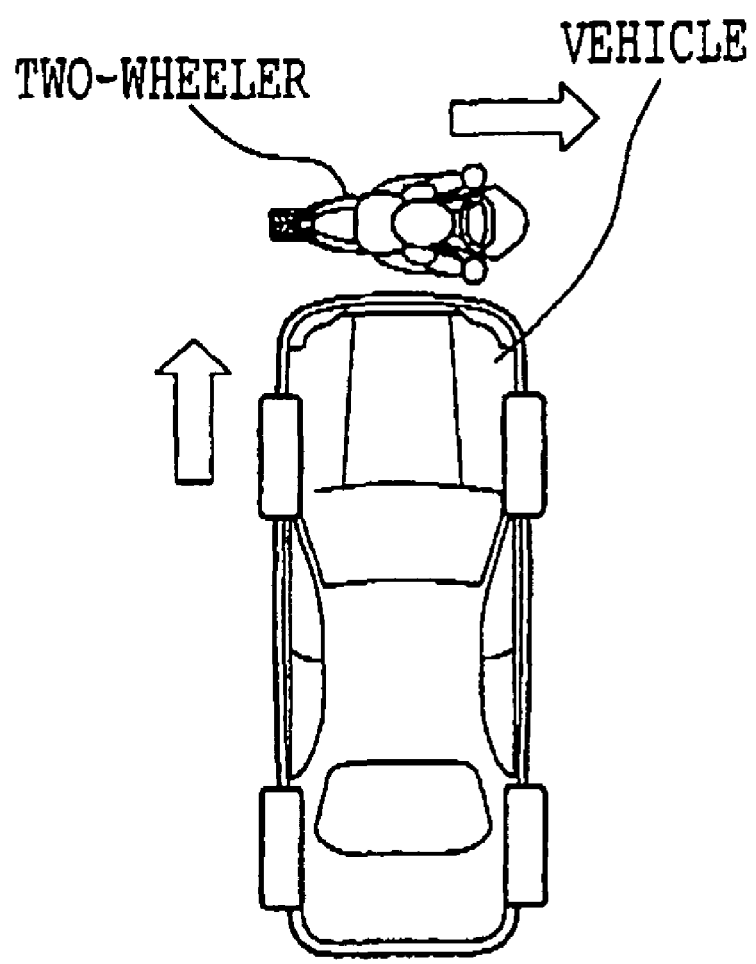
FIG. 22 is a schematic drawing illustrating the form of collision between the two-wheeler and the vehicle.

Next, the two-wheeler collision behavior control will be described. In the case of the two-wheeler side collision as shown in FIG. 22, in which form the number of accidents occurred is the highest, the rider may be sandwiched between the two-wheeler and the vehicle to be injured, and because of being sandwiched, it is difficult to control the collision behavior of the rider. Therefore, in order to control the collision behavior of the rider, it is necessary to avoid the rider being sandwiched. The two-wheeler is contacted with the road surface at the front and rear wheels, and is capable of being run by the rider taking balance, and by changing the balanced state, the direction of movement can be easily changed.

In other words, as shown in FIG. 23, by pressing a portion in the vicinity of the road surface contacting area of the wheel of the two-wheeler by means of the two-wheeler collision behavior control element composed of an air bag element, or the like, that is disposed at the vehicle front, the balanced state can be changed for changing the direction of movement of the two-wheeler into the vehicle direction. When the two-wheeler is moved toward the vehicle direction, a rotational movement with the center of rotation being taken at a portion in the vicinity of the road surface contacting area of the wheel is generally caused, thus the two-wheeler will stop the forward or backward movement. The stop positions at this time of the two-wheeler and the rider are different from each other as shown in FIG. 23.

In addition, because the connection between the two-wheeler and the rider is not firm, the rider will be separated from the two-wheeler at the stop. This situation of separation between the two-wheeler and the rider has also been confirmed by the experimental result. However, as an experiment, there may occur sandwiching of the rider as described above. Therefore, by, after separating the rider from the two-wheeler, developing the air bag element for the rider protection apparatus 41 to control the collision behavior of the two-wheeler rider, as with the collision behavior control of the pedestrian, the collision behaviors of the two-wheeler and the rider can be individually controlled.

Figure 25:
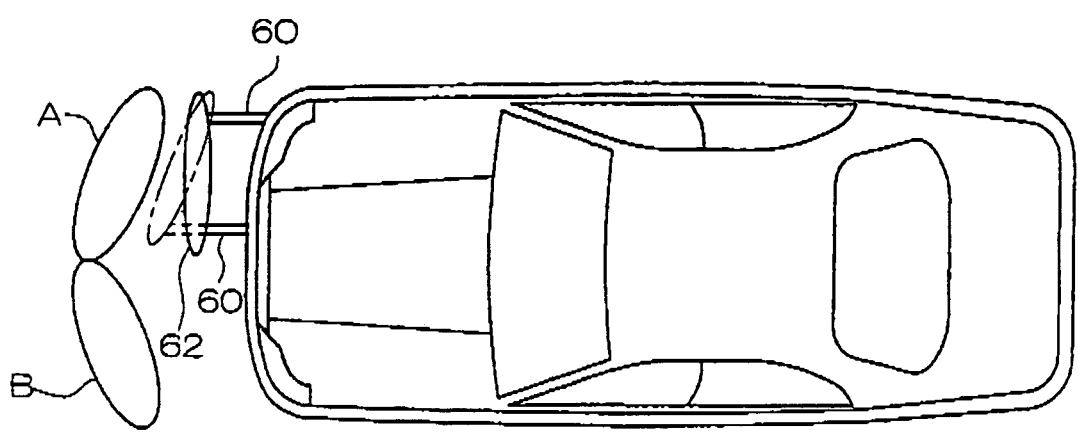
FIG. 25 is a schematic drawing illustrating the relative angle between the contacting part of the two-wheeler collision behavior control element and the two-wheeler.

Next, the two-wheeler collision behavior control using the two-wheeler collision behavior control element as described above will be described. The collision form as shown in FIG. 22 is the form in which the vehicle collides against the two-wheeler side, however, depending upon the collision situation, the relative position relationship between the two-wheeler and the vehicle may not always be that as shown in FIG. 22, but as shown in FIG. 25, a relative position A or a relative position B where the inclination angle between the vehicle and the two-wheeler is different may be produced.

In such a case, by changing the respective amounts of extension (pushing-out lengths) of the pushing-out parts, such as the extension and contraction rods, or the like, which are disposed adjacent to each other, for changing the inclination angle, the control of the collision behavior of the two-wheeler is carried out. Thereby, by inclining the two-wheeler contacting part according to the relative position relationship with respect to the two-wheeler, contact with the two-wheeler can be had. Such a control can be performed by determining the orientation of the wheel of the two-wheeler with the control apparatus 24 from the relative position relationship between the two-wheeler and the vehicle, and the external environment detected by the external environment detection means, and controlling the respective pushing-out lengths of the pushing-out parts according to the orientation of the wheel.

As the angle between the wheel of the two-wheeler and the two-wheeler contacting part, when the vehicle collides against the side of the two-wheeler, it is preferably an angle at which the side of the wheel is substantially parallel with the contact surface of the two-wheeler contacting part.

As described above, a two-wheeler which has been contacted with the two-wheeler contacting part is changed in the balanced state, thus the direction of movement of the two-wheeler is changed into the vehicle direction, and the two-wheeler and the two-wheeler rider are inclined, resulting in the two-wheeler and the rider being separated from each other. The two-wheeler rider separated will be brought to near the vehicle with a low posture by the inertia, and being pressed by the contacting part of the air bag element for the two-wheeler rider protection apparatus 41, is moved to the vehicle side without being bumped up onto the vehicle hood. Thereby, the damage to the two-wheeler rider at the time of collision will be alleviated.

As described above, the pushing-out angle of the two-wheeler collision behavior control element can be controlled to an optional one, and thus even in any of a variety of two-wheeler collision forms, the collision behavior of the two-wheeler can be controlled to separate between the two-wheeler and the rider for alleviating the damage to the two-wheeler rider.

Figure 26A:
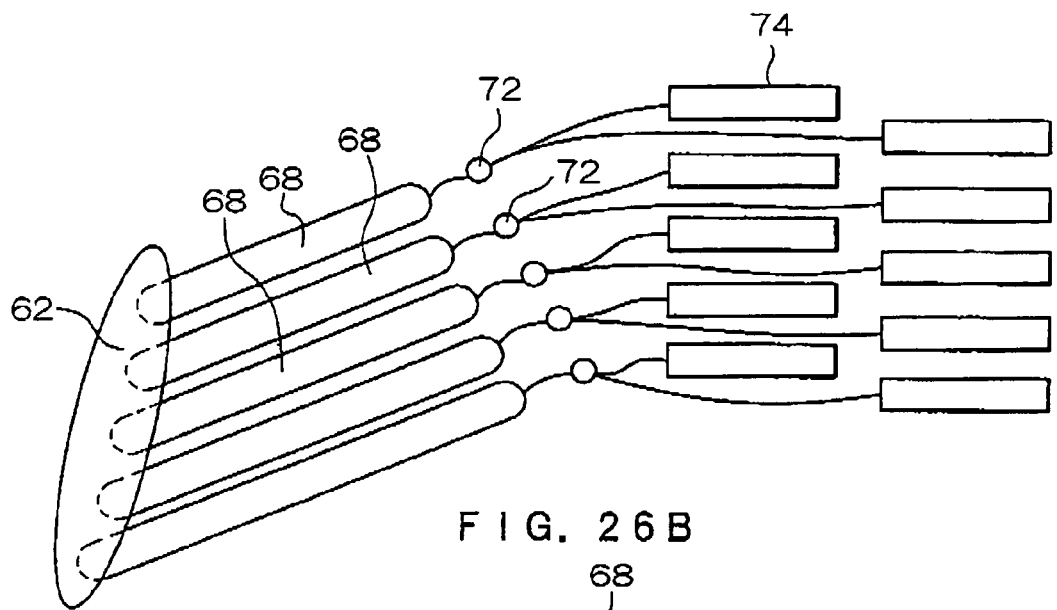
FIG. 26A and FIG. 26B are schematic drawing illustrating other examples of the air bag element constituting the two-wheeler collision behavior control element.
Figure 26B:
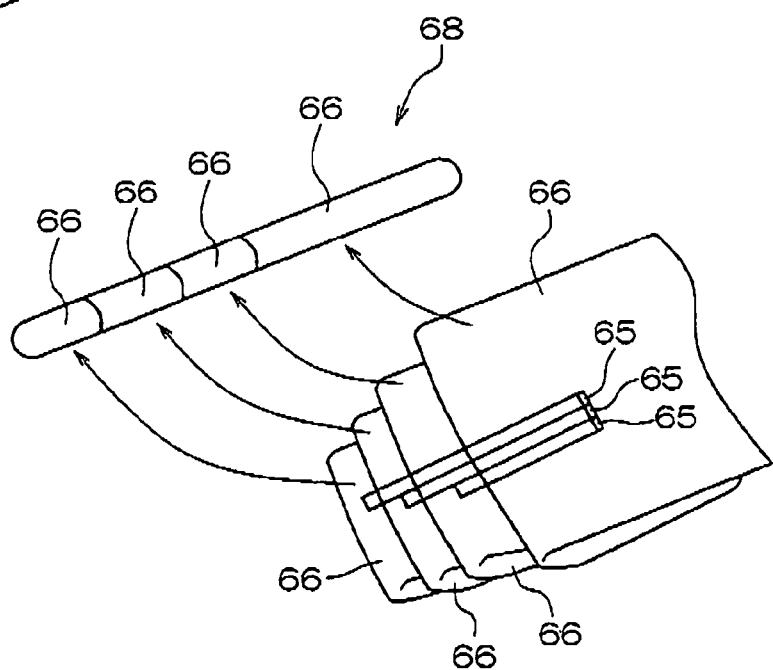

In order to change the angle of the two-wheeler contacting part which contacts the two-wheeler, a plurality of small air bag elements as shown in FIG. 26 may be used besides the two-wheeler pressing apparatus 64 as shown in FIG. 24B and FIG. 24C.

This air bag element is provided with a pushing-out part configured by arranging a plurality of extension and contraction air bag elements 68 in parallel. The extension and contraction air bag element 68 is configured by connecting a plurality of (for example, four as shown in the figure) of small air bag elements 66 which are developed in a bar-like shape, through pressure partition walls 65 which are opened with different pressures.

To the tip parts of the extension and contraction air bag elements 68 constituting the pushing-out part, a two-wheeler contacting part 62 constituted by a small air bag element is connected as if it got astride them. The respective extension and contraction air bag elements are connected to a plurality of inflators 74 connected to a control apparatus 24 through a control valve 72 and a piping connected to the control apparatus 24.

To the extension and contraction air bag element, a plurality of inflators are connected, thus by using the control apparatus to switch the control valve and operate the inflators for controlling the amount of supply of the gas generated in the inflators to each of the extension and contraction air bag elements, the pressure partition wall is opened according to the supplied pressure for controlling the number of small air bag elements which are developed, whereby the two-wheeler contacting part can be pushed out, being inclined.

In addition, as the pressure control method, the method which controls the number of inflators to be connected to the air bag element as described above, or the method which controls the degree of opening of the control valve provided in the piping path are available.

The contacting part connected to the tip of the pushing-out part may be configured by using a woven cloth, a plastic sheet, or a thin metallic sheet, besides the air bag element as described above.

The timing at which the two-wheeler contacting part is to be pushed out is controlled according to the speed of movement of the driver's own vehicle, the sizes of the two-wheeler and the rider which have been measured by the sensor, and the like.

In addition, the timing at which the two-wheeler contacting part is to be pushed out may be changed according to the front geometry of the vehicle, and the like. For example, two-wheeler riders are often contacted with a cab-over type vehicle at an earlier timing than with a sedan type vehicle, the two-wheeler contacting part may be pushed out at an earlier timing for the cab-over type vehicle than for the sedan type vehicle.

The above-described series of collision behavior controls prevent the two-wheeler rider from being bumped up and sandwiched at the time of collision, resulting in the damage to the rider at the time of collision is alleviated. The two-wheeler behavior control element as described above can also be used as the pedestrian vehicle control section which controls the behavior of the pedestrian.

What is claimed is:

1. A collision behavior control apparatus in a vehicle having a front face extending substantially perpendicular to the length of the vehicle, comprising two contacting members, one of the contacting members being disposed at each of respective left and right lateral sides on the front face of the vehicle, wherein each contacting member comprises an inflatable folded air bag element which is accommodated in a lateral portion of the front face of a vehicle, and a contacting portion mounted to the air bag element, wherein a capacity of the air bag element at a location centrally on the vehicle front face is greater than the capacity of the air bag element at a location laterally on a respective one of the sides of the vehicle front face where the respective air bag is provided, whereby, upon deployment of the contacting portion to a contacting position, the contacting portion projects farther at a location centrally on the vehicle front face than at a location laterally on the respective side of the vehicle front face where the respective air bag is provided, and is shaped to suppress an object having a center of gravity whose height corresponds to that of a person riding a two-wheeler, when colliding with the front face of the vehicle, from being bumped up onto the hood of the vehicle, and to promote the colliding object, when colliding with the front face of the vehicle, being pushed to the respective lateral side of the vehicle.

2. The collision behavior control apparatus according to claim 1, wherein the height of the contacting member is sufficiently in the vicinity of the height of the center of gravity of the object that the object is neither bumped up onto the hood of the vehicle nor pushed under the vehicle.

3. A collision behavior control apparatus in a vehicle having a front face extending substantially perpendicular to the length of the vehicle, comprising:
   relative position detection means for detecting the relative position of an object with respect to the vehicle;
   direction and speed detection means for detecting the direction of movement and the speed of the vehicle;
   two folded inflatable air bag elements, each of which comprises a contacting portion, wherein each one of said two folded inflatable air bag elements is disposed at respective left and right lateral sides on the front face of the vehicle, wherein a capacity of each of the air bag elements at a location centrally on the vehicle front face is greater than the capacity of the air bag element is at a location laterally on the respective side of the vehicle front face where the respective air bag element is provided, whereby, upon deployment of the contacting portion to a contacting position, the contacting portion projects farther at a location centrally on the vehicle front face than at a location laterally on the vehicle front face at the respective side where the air bag is provided, and is shaped to suppress the object having a center of gravity whose height corresponds to that of a person riding a two-wheeler, when colliding with the front face of the vehicle, from being bumped up onto the hood of the vehicle, and to promote the object, when colliding with the front face of the vehicle, being pushed to the respective lateral side of the vehicle;
   collision determination means for determining whether there will occur a collision of the vehicle with the object on the basis of relative position information detected by the relative position detection means and information indicating the direction of movement and the speed of the vehicle detected by the direction speed detection means;
   collision process prediction means for predicting the process of a collision against the object on the basis of the result of the determination of the collision determination means, the relative position information, and the information indicating the direction of movement and the speed of the vehicle; and
   control means for controlling, on the basis of the prediction information predicted by the collision process prediction means, deployment of the contacting portion to suppress the object when colliding with the front face of the vehicle from being bumped up onto the hood of the vehicle, and to promote the object being pushed to the respective lateral side of the vehicle.

4. The collision behavior control apparatus of claim 3, wherein the object is two wheeled vehicle and the control means includes a two wheeled vehicle behavior control element which pushes the two wheeled vehicle to control the behavior of the two wheeled vehicle, and to separate the two wheeled vehicle from the rider of the two wheeled vehicle, wherein the two wheeled vehicle behavior control element is controlled by the control means on the basis of prediction information predicted by the collision process prediction means such that the two wheeled vehicle and the rider are separated from each other.

5. The collision behavior control apparatus of claim 4, wherein a portion of the wheel of the two wheeled vehicle in the vicinity of the road surface is pressed by the two wheeled vehicle behavior control element.

6. The collision behavior control apparatus of claim 4, wherein
the two wheeled vehicle behavior control element includes an inflatable air bag element which is accommodated in a portion of the front face of a vehicle, being folded; and
a two wheeled vehicle contacting member which comprises a contacting portion to be contacted with the two wheeled vehicle, and is mounted to the air bag element.

7. The collision behavior control apparatus of claim 4, wherein
the two wheeled vehicle behavior control element includes extension and contraction means which is extendably and contractably provided for the vehicle;
a two wheeled vehicle contacting member which comprises a contacting portion to be contacted with the two wheeled vehicle, and is mounted to the tip of the extension and contraction means; and
driving means which drives the extension and contraction means such that the extension and contraction means is extended.

8. The collision behavior control apparatus according to claim 3, wherein the height of the contacting portion is sufficiently in the vicinity of the height of the center of gravity of the object that the object is neither bumped up onto the hood of the vehicle nor pushed under the vehicle.

9. The collision behavior control apparatus of claim 3, including a telescoping element for deploying the contact means.

* * * * *